United States Patent
Hodge

(10) Patent No.: US 11,386,772 B2
(45) Date of Patent: *Jul. 12, 2022

(54) AUGMENTED REALITY SYSTEM FOR GUARDS OF CONTROLLED ENVIRONMENT RESIDENTS

(71) Applicant: **Global Tel*Link Corporation**, Reston, VA (US)

(72) Inventor: Stephen L. Hodge, Aubrey, TX (US)

(73) Assignee: **Global Tel*Link Corporation**, Reston, VA (US)

( * ) Notice: Subject to any disclaimer, the term of this patent is extended or adjusted under 35 U.S.C. 154(b) by 43 days.

This patent is subject to a terminal disclaimer.

(21) Appl. No.: 17/073,585

(22) Filed: Oct. 19, 2020

(65) Prior Publication Data
US 2021/0104148 A1 Apr. 8, 2021

Related U.S. Application Data

(63) Continuation of application No. 16/557,882, filed on Aug. 30, 2019, now Pat. No. 10,810,862, which is a (Continued)

(51) Int. Cl.
*G08B 25/10* (2006.01)
*G08B 21/04* (2006.01)
(Continued)

(52) U.S. Cl.
CPC ............ *G08B 25/10* (2013.01); *G06V 20/20* (2022.01); *G06V 20/52* (2022.01); *G08B 5/22* (2013.01);
(Continued)

(58) Field of Classification Search
CPC ..................... G08B 21/24; A61F 13/42; A61F 2013/15146; A61F 2013/424
See application file for complete search history.

(56) References Cited

U.S. PATENT DOCUMENTS 10,403,123 B2  9/2019 Hodge
10,810,862 B2  10/2020 Hodge
(Continued)

OTHER PUBLICATIONS

International Search Report and Written Opinion of the International Searching Authority directed to related International Patent Application No. PCT/US2018/058534, dated Apr. 1, 2019; 16 pages.

(Continued)

*Primary Examiner* — Nabil H Syed
*Assistant Examiner* — Cal J Eustaquio
(74) *Attorney, Agent, or Firm* — Sterne, Kessler, Goldstein & Fox P.L.L.C.

(57) ABSTRACT

The present disclosure provides details of a system and method for a communication device for guards in a controlled environment. The communication device is established based on a wireless infrastructure in the controlled environment, receiving wireless positioning signals to calculate and determine the real-time location of personnel carrying the device. The indoor wireless positioning can be combined with other available positioning methods to provide highly accurate positioning information of the personnel. The communication device detects and records activities of the personnel during a period of time, and is controlled by the control center. The status of personnel is monitored by control center. Meanwhile, the communication device has AR functions that allow physical objects and augmented reality element to be displayed to the personnel at the same time. The personnel can thus have improved awareness of the surrounding environment and can respond to various potential dangers more effectively.

20 Claims, 14 Drawing Sheets

Related U.S. Application Data continuation of application No. 15/799,553, filed on Oct. 31, 2017, now Pat. No. 10,403,123.

(51) Int. Cl.

| | |
|---|---|
| *H04W 4/021* | (2018.01) |
| *G08B 5/22* | (2006.01) |
| *G08B 25/00* | (2006.01) |
| *H04W 4/02* | (2018.01) |
| *G08B 23/00* | (2006.01) |
| *G06V 20/20* | (2022.01) |
| *G06V 20/52* | (2022.01) |
| *G06T 11/60* | (2006.01) |

(52) U.S. Cl.
CPC ......... *G08B 21/0423* (2013.01); *G08B 23/00* (2013.01); *G08B 25/00* (2013.01); *H04W 4/02* (2013.01); *H04W 4/021* (2013.01); *G06T 11/60* (2013.01)

(56) References Cited

U.S. PATENT DOCUMENTS

| | | |
|---|---|---|
| 2014/0018059 A1 | 1/2014 | Noonan |
| 2014/0267403 A1 | 9/2014 | Maciocci et al. |
| 2014/0344002 A1 | 11/2014 | Masterlark |
| 2016/0005233 A1 | 1/2016 | Fraccaroli et al. |
| 2016/0337829 A1 | 11/2016 | Fletcher et al. |
| 2017/0116846 A1 | 4/2017 | Wengrovitz et al. |
| 2017/0124836 A1 | 5/2017 | Chung et al. |
| 2017/0312556 A1 | 11/2017 | Smith |
| 2018/0018861 A1 | 1/2018 | Locke et al. |
| 2019/0108740 A1 | 4/2019 | Coke et al. |
| 2019/0110181 A1 | 4/2019 | Kavantsaari |
| 2019/0130733 A1 | 5/2019 | Hodge |

OTHER PUBLICATIONS

Hung, Vivian et al., "A Market Survey on Body Worn Camera Technologies," Johns Hopkins University, Nov. 2016, available at: https://www.ncjrs.gov/pdffiles1/nij/grants/250381.pdf; pp. 5-83-5-94; 5-137-5-145; 5-308-314.

AUGMENTED REALITY SYSTEM FOR GUARDS OF CONTROLLED ENVIRONMENT RESIDENTS

CROSS-REFERENCE TO RELATED APPLICATIONS

This application is a continuation of U.S. patent application Ser. No. 16/557,882 filed on Aug. 30, 2019, which is a continuation of U.S. patent application Ser. No. 15/799,553 filed on Oct. 31, 2017, now U.S. Pat. No. 10,403,123, which are incorporated by reference herein in their entireties.

BACKGROUND

Field

The disclosure relates to a system and method for communication devices for guards of controlled environments.

Background

In a controlled environment, staff/guards constantly need to go on different assignments which places the staff/guards at locations with limited communication with the control center of the controlled environment, or in situations where staff/guards have difficulties detecting and responding quickly to potential danger. In some situations, activities of guards lack monitoring, giving some staff/guards the opportunity to get involved in importation of contraband goods into the controlled environment.

BRIEF DESCRIPTION OF THE DRAWINGS/FIGURES

The accompanying drawings, which are incorporated herein and form a part of the specification, illustrate embodiments of the present disclosure and, together with the description, further serve to explain the principles of the disclosure and to enable a person skilled in the pertinent art to make and use the embodiments.

Figure 1:
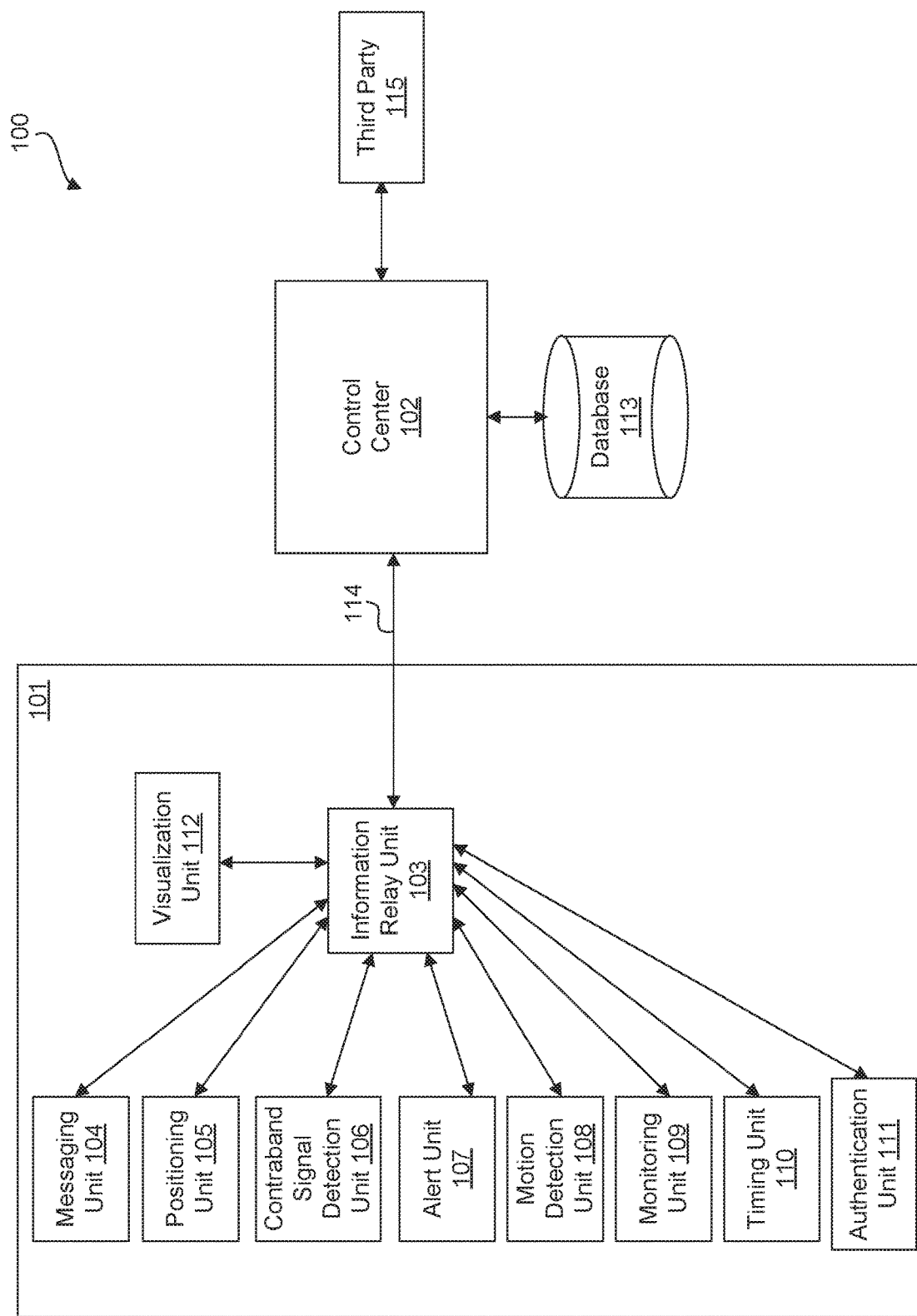
FIG. 1 illustrates a block diagram of a communication system for guards of a controlled environment, according to embodiments of the present disclosure.

The present disclosure will be described with reference to the accompanying drawings. In the drawings, like reference numbers indicate identical or functionally similar elements. Additionally, the left most digit(s) of a reference number identifies the drawing in which the reference number first appears.

DETAILED DESCRIPTION

The following Detailed Description refers to accompanying drawings to illustrate exemplary embodiments consistent with the disclosure. References in the Detailed Description to "one exemplary embodiment," "an exemplary embodiment," "an example exemplary embodiment," etc., indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to affect such feature, structure, or characteristic in connection with other exemplary embodiments whether or not explicitly described.

The exemplary embodiments described herein are provided for illustrative purposes, and are not limiting. Other exemplary embodiments are possible, and modifications may be made to the exemplary embodiments within the spirit and scope of the disclosure. Therefore, the Detailed Description is not meant to limit the invention. Rather, the scope of the invention is defined only in accordance with the following claims and their equivalents.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc. Further, any of the implementation variations may be carried out by a general purpose computer, as described below.

For purposes of this discussion, any reference to the term "module" shall be understood to include at least one of software, firmware, and hardware (such as one or more circuit, microchip, or device, or any combination thereof), and any combination thereof. In addition, it will be understood that each module may include one, or more than one, component within an actual device, and each component that forms a part of the described module may function either cooperatively or independently of any other component forming a part of the module. Conversely, multiple modules described herein may represent a single component within an actual device. Further, components within a module may be in a single device or distributed among multiple devices in a wired or wireless manner.

The following Detailed Description of the exemplary embodiments will so fully reveal the general nature of the invention that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

Overview

With conventional monitoring and communication system for a controlled environment, it is sometimes difficult for a control center of the controlled center to effectively communicate with and monitor staff/guards (hereinafter "personnel") during an assignment. Also, it is sometimes difficult for personnel to effectively detect potential danger and protect themselves. As a result, personnel is in danger, and importation of contraband goods occurs. Meanwhile, smart devices utilized in a controlled environment allow personnel to stay in constant contact with the control center of the controlled environment. The use of these devices would offer many other features and functions that would prove beneficial to the personnel and jurisdictions.

The present disclosure provides details of a system and method for a communication device for guards in a controlled environment. The communication device is established based on a wireless infrastructure in the controlled environment, receiving wireless positioning signals to calculate and determine the real-time location of personnel carrying the device. The indoor wireless positioning can be combined with other available positioning methods, e.g., GPS positioning, to provide highly accurate positioning information of the personnel. The communication device detects and records activities of the personnel during a period of time, and is controlled by the control center. The status of personnel is monitored by control center. Meanwhile, the communication device has AR functions that allow physical objects and augmented reality element to be displayed to the personnel at the same time. The personnel can thus have improved awareness of the surrounding environment and can respond to various potential dangers more effectively. The control center and the communication device respond quickly to different situations. In addition, the communication device detects contraband electronic devices, items out of place, and inmates in forbidden locations, and monitors surroundings of the personnel in real-time. Third party can also monitor real-time of the personnel and the surrounding environment in real-time. Thus, the disclosed system and method for the communication device provides improved communication and monitoring for personnel in a controlled environment.

Communication System for Guards of Controlled Environments

FIG. 1 illustrates a block diagram of a communication system 100 for guards of a controlled environment, according to embodiments of the present disclosure. Communication system 100 allows a user or personnel to more effectively monitor surrounding activities during an assignment, allows activities of guards to be tracked and monitored in real-time, facilitates real-time communications between guards and a control center, and automatically triggers a plurality of functionalities when the monitored activities are determined to be abnormal.

In various embodiments of the present disclosure, "abnormal" is determined as an activity/action/status, being monitored, satisfying certain criterion/criteria defined by system 100. Communication system 100 stores, e.g., in database 113 and/or multi-functional platform 101, a set of criteria defining whether a monitored activity is determined as "normal" and "abnormal." For example, the set of criteria includes the time range to complete an assignment, the designed path for an assignment, the dwelling time at one location, the heart rate range, the regular presence locations of inmate, etc. Monitored activities fail to satisfy the criteria are determined to be "abnormal" by communication system 100. In various different embodiments, communication system 100 determines abnormal activities for different monitored activities. Details can be referred to in the description below.

In an embodiment, communication system 100 includes a multi-functional platform 101 and a control center 102, connected or coupled through connection link 114. Multi-functional platform 101 includes an information relay unit 103, a messaging unit 104, a positioning unit 105, a contraband signal detection unit 106, an alert unit 107, a motion detection unit 108, a monitoring unit 109, a timing unit 110, an authentication unit 111, and a visualization unit 112. In one embodiment, communication system 100 further includes a database 113, connected to control center 102. Multi-functional platform 101 is arranged in a controlled environment. In an embodiment, control center 102 is arranged inside the controlled environment. In another embodiment, control center 102 is arranged outside the controlled environment, e.g., at a remote location. In some embodiments, control center 102 is connected to and communicates with third party 115. In operation, multi-functional platform 101 sends various data reflecting the status of personnel to control center 102 to be processed and analyzed. Accordingly, control center 102 determines the personnel' status or activities based on the received data and sends corresponding responses to multi-functional platform 101 to be executed. In some embodiments, third party 115 accesses certain data of the personnel through control center 102.

In an embodiment, control center 102 includes any suitable software and hardware that facilitate communication between a monitoring personnel, e.g., staff or jurisdiction officer, and a monitored personnel, e.g., a guard, staff, or officer in the controlled environment. In an embodiment, control center 102 is further connected to workstations (not shown) or other computer systems/networks (not shown) for addition operations. Control center 102 includes software and hardware for displaying real-time status of a guard in the controlled environment, based on received signals. For example, control center 102 displays a map of the control environment and the status and location of monitored personnel in the map.

Control center 102 is installed with suitable software and hardware for receiving and processing various data sent by different units of multi-functional platform 101. Control center 102 has the option to store, process, and/or display these data. In some embodiments, control center 102 controls the content of information displayed by visualization unit 112. In some embodiments, control center 102 obtains data from database 113 or receives input from a user of control center 102 and sends the data to the personnel carrying multi-functional platform 101. The data is processed and/or displayed in visualization unit 112. In some embodiments, control center 102 joins images and/or videos recorded by different units to a desired format, e.g., a wide-angle landscape-style image/video formed by a plurality of images/videos taken from different angles, and displays the joined image/video to the personnel. In some embodiments, control center 102 is installed with software and hardware that control the operations of different units of multi-functional platform 102. In some embodiments, commands from control center 102 override commands from the monitored personnel.

Control center 102 also monitors the activities of the monitored personnel carrying multi-functional platform 102. In various embodiments, control center 102 monitors and displays the path, moving speed, dwelling time, body motion, and/or heart rate of a guard. In an embodiment, control center 102 is installed with software for remotely controlling the parts and functions multi-functional platform 101. For example, a monitoring personnel of control center 102 turns on and off certain units, e.g., the monitoring unit 109 of multi-functional platform 101, at a desired time. In an embodiment, control center 102 includes hardware and software for facilitating communication between the monitored personnel in the control environment and monitoring user at control center 102, and control center 102 monitors the communication in real-time. For example, control center 102 includes and a messaging program for the monitoring personnel and the monitored personnel to communicate in type-in messages or voice messages. In an embodiment, control center 102 includes software and hardware for receiving and playing audio/video data from multi-functional platform 101. For example, in an embodiment, control center 102 includes a speaker and a microphone so that personnel using multi-functional platform 101 and the monitoring personnel of control center 102 can have real-time conversations. In case of an abnormal activity received from multi-functional platform 101, control center 102 plays an alert through the speaker. The alert includes any suitable pre-recorded messages for attracting the attention of the audience. In various embodiments, control center 102 is installed with software for recording various information of each monitored personnel. For example, control center 102 records moving path, moving speed, dwelling time, body motion, heart rate, conversations, messages, and/or recorded images/videos associated with each monitored personnel. In various embodiments, control center 102 has the authority to monitor any information forwarded by information relay unit 103. In another example, control center 102 allows the monitoring personnel to access the real-time video streaming and/or observes views observed by the monitored personnel. Other communication means can also be used at the same time such that the monitored user and the monitored personnel observe, communicate, and respond to situations in the surroundings at the same time.

In various embodiments, abnormal activities that trigger responses of control center 102 include the path of the monitored personnel deviating from a designed path, monitored personnel not responding to an inquiry within a certain period of time, monitored personnel having a sudden body motion, monitored personnel having a sudden heart rate increase, monitored personnel failing to complete an assignment within a certain period of time, monitored personnel sending an alert, detection of contraband wireless signals, detection of abnormal presence of inmates, items out of place or in abnormal conditions, etc.

In an embodiment, database 113 stores any suitable data that can be used for the communication and monitoring functions of control center 102. For example, database 113 stores biometric data, identification data, and profile data of the monitoring personnel, monitored personnel, and/or inmates, offense history and reasons for incarceration of inmates, contact history, distribution information of multi-functional wireless devices used by inmates, a map of the control environment, designed paths for the monitored personnel, coordinates of certain locations and objects, reference data for positioning, criteria for determining "abnormal" and "normal" status/activities/actions, conversation history and messages associated with the monitored personnel, etc. For example, biometric data includes voice samples, fingerprints, retina samples, and/or facial structures associated with a monitored or monitoring personnel; identification data includes biometric data, name, birthday, social security number (SSN), and/or PIN number associated with a monitored or monitoring personnel; profile data includes identification data, offense history, contact history, reason of incarceration, cell number, and/or assigned multi-functional wireless device. The map of the control environment includes coordinates of the boundaries of cells, areas, walls, and/or names and restrictions of each cell/area. Designated paths for monitored personnel define, e.g., areas, paths, dwelling times, assignment completion time, and/or moving directions a monitored personnel is expected to follow in an assignment. Reference data for determining the location or proximity includes, e.g., coordinates of positioning signal transmitters and positioning signal strength in the proximity of the signal transmitters. Criteria for determining which status are "normal" includes a set of ranges in, e.g., time, distance, location, path, moving speed, and body condition, during an assignment or a certain period of time, for limiting the activities of the monitored personnel. "Abnormal" status refers to these status failing to satisfy the criteria. For example, it is determined the monitored personnel following the designed path being "normal," and a deviation from the designed path is determined to be "abnormal." Conversation history and messages associated with a monitored personnel include the conversation history and messages recorded during an assignment in the control environment. In various embodiments, control center 102 also includes a display unit for displaying status of one or more monitored personnel, a user input device for receiving commands/selections from a monitoring personnel, etc.

In an embodiment, control center 102 simulates real-time activities of a monitored personnel based on data stored in database 113 and signals/data sent by multi-functional platform 101. Control center 102 uses the data to generate graphics, images, and/or text based on the received and stored data. For example, control center 102 extracts coordinates information from database 113 to generate a map of the controlled environment, simulate/calculate the path, moving speed, and/or dwelling times of the monitored personnel in the map based on the real-time data received by multi-functional platform 101. A monitoring personnel then directly observes and monitor the activity of a monitored personnel. In various embodiments, control center 102 also simulates other detectable objects/subjects in real-time in the map. For example, based on data/signals sent by multi-functional platform 101, control center 102 also simulates the presence and status of inmates wearing/carrying certain signal-transmitting tags, e.g., radio frequency (RF) ID tags, and/or any devices transmitting a suitable detectable signal, e.g., a kiosk, a contraband device, and/or a vending machine. The detectable objects/subjects are also displayed in the map to the monitoring personnel. In an embodiment, control center 102 also sends calculated path, moving speed and path to respond based on the activities. For example, control center 102 determines whether any abnormal activities occurred based on the calculation result, and/or respond accordingly based on the abnormal activities. In an embodiment, control center 102 displays certain simulation results in the form of graphics, images, sound, and/or text, to the monitored personnel and/or the monitoring personnel. In an embodiment, the simulation results are displayed by visualization unit 112.

In an embodiment, control center 102 responds to data/signals sent by multi-functional platform 101. Control center 102 is programmed to respond to different inquiries from multi-functional platform 101 and extract necessary data from database 113 for the responses. Control center 102 directly responds to some signals/data, e.g., emergency calls/alerts. A monitoring personnel has the option to manually interrupt and respond to some signals/data through control center 102. In some embodiments, a monitoring personnel is required to authenticate his/her identity before interrupting the operations of control center 102. Decisions made by control center 102 are transmitted to information relay unit 103 through connection link 114 and implemented in designated units of multi-functional platform 101. In various embodiments, control center 102 responds to inquiries such as detection of abnormal activities of the monitored personnel, detection of contraband wireless signals, detection of items out of place, and/or messages/alerts/video streams/images sent by the monitored personnel. Response of control center 102 to the inquiries includes starting certain monitoring functions of multi-functional platform 101, sending alerts/alerts to one or more monitored personnel, etc. In some embodiments, control center 102 records the activities during a certain period of time or assignment and analyze the recorded history if necessary. For example, conversation or messages of a monitored personnel can be recorded, parsed, and/or analyzed.

In some embodiments, control center 102 includes suitable hardware and software for performing virtual reality (VR) functions. For example, control center 102 utilizes real-time data and/or non-real-time data to construct a virtual reality (VR) space for the monitoring personnel. The real-time data and non-real-time data can be any suitable data received by control center 102. For example, these data can include real-time video streaming data and recorded non-real-time video data captured by any suitable imaging devices, e.g., cameras, of multi-functional platform 101. These data can also include positioning data, facial recognition data, audio data, AR data, etc. When using real-time video streaming data to construct a VR space, control center 102 simulates the surroundings of the monitored personnel based on real-time data such as the real-time video data, real-time audio data, and positioning data of the monitored personnel to present the surroundings of the monitored personnel in a VR space. When using non-real-time data to construct a VR space, control center 102 simulates the surroundings of the monitored personnel based on non-real-time data such as recorded video data, recorded audio data, and recorded positioning data of the monitored personnel to present the surroundings of the monitored personnel in a VR space. In some embodiments, the monitoring personnel has the option to choose real-time/non-real-time data streamed/recorded from one or more desired imaging devices to construct the VR space. The monitoring personnel thus has the option to observe the surroundings of the monitored personnel in a VR space in a real-time session or in a previously recorded. In some embodiments, control center 102 further includes VR devices, e.g., headsets, helmets, goggles, etc., worn by the monitoring personnel to enhance VR effects.

Control center 102 is bi-directionally connected to multi-functional platform 101 through connection link 114. Connection link 114 includes any suitable wired (e.g., Ethernet) connection or wireless connection. The wireless connection can be implemented as one or more of a wide-area network (WAN) connection, a local area network (LAN) connection, the Internet, a Bluetooth connection, and/or an infrared connection. Other types of implementations for a wired or wireless connection are possible without deviating from the scope of the present disclosure. Control center 102 has the authority to control the functioning of various units in multi-functional platform 101.

Information relay unit 103 is bi-directionally connected to control center 102. Information relay unit 103 includes hardware and software to receive various data/signals from other units in the multi-functional platform 101 and forward the received data/signal to control center 102, and receive signals/data from control center 102 and distribute the signals/data to proper units. In some embodiments, information relay unit 103 is configured to determine the proper data to be sent to control center 102. For example, when positioning unit 105 sends both indoor and outdoor tracking or positioning information to information relay unit 103, information relay unit 103 determines the appropriate positioning information to be forwarded to control center 102 based on the actual location of the monitored personnel. In an example, information relay unit 103 determines the actual location of the monitored personnel based on the received tracking information from positioning unit 105 and sends the positioning information that more precisely reflects the actual position/status of the monitored personnel. In an example, when information relay unit 103 determines the monitored personnel is located in the indoor environment of the control environment, information relay unit 103 only sends the indoor positioning information to control center 102; when information relay unit 103 determines the monitored personnel is located in the outdoor environment of the control environment, information relay unit 103 only sends the outdoor positioning information to control center 102. In some embodiments, information relay unit 103 sends both indoor positioning information and outdoor positioning information sent by positioning unit 105 to control center 102. In various embodiments, information relay unit 103 encrypts information sent to control center 102 and decrypts information sent by control center 102.

Messaging unit 104 is bi-directionally connected to control center 102 and includes software and hardware to facilitate texting/messaging functions between the monitored personnel and control center 102. In an embodiment, the messages transmitted between multi-functional platform 101 and control center 102 are in various forms such as text messages, videos, images, audio messages, and/or real-time video streams. The monitored personnel has the option to enter desired text and/or audio, take pictures and/or record videos, or stream videos. The various forms of messages are sent to control center 102 through information relay unit 103. In an embodiment, messaging unit 104 also enables texting/messaging functions among different monitored personnel. A monitored personnel has the option to select a desired recipient and the various forms of messages are redirected to the selected recipient by control center 102. A monitoring personnel at control center 102 has the authority to monitor any messages forwarded by information relay unit 103.

Positioning unit 105 tracks both the indoor position and the outdoor position of the monitored personnel. Positioning unit 105 is bi-directionally connected to control center 102 through information relay unit 103 and includes software and hardware to enable the positioning of the monitored personnel when the monitored personnel is in the indoor or outdoor environment of the control environment, where positioning signals are available. In some embodiments, positioning unit 105 includes an outdoor positioning sub-unit. In an embodiment, the outdoor positioning sub-unit includes a global positioning system (GPS) receiver. In some other embodiments, other GPS-based positioning means or other positioning systems are also used alone or in combination with GPS. The outdoor positioning sub-unit determines the locations of one or more monitored personnel in real-time. The outdoor positioning sub-unit periodically sends coordinates of the monitored personnel to information relay unit 103, and information relay unit 103 determines whether the coordinates are to be sent to control center 102.

In some embodiments, positioning unit 105 also includes an indoor positioning sub-unit. The indoor positioning sub-unit periodically sends location-reflecting signals/data to information relay unit 103. In an embodiment, the indoor positioning sub-unit includes one or more of any suitable wireless positioning facilities such as radio frequency (RF)-based positioning systems, Bluetooth-based positioning systems, WiFi-based positioning systems, and/or ultrasound-based positioning systems. For example, the RF-based positioning system includes a RFID reader and a plurality of RFID tags/beacons distributed in the indoor environment. The RFID reader, carried by the monitored personnel, reads information stored in the nearby RFID tags and sends the read-out information to information relay unit 103. In another example, the WiFi-based positioning system includes a WiFi-signal reader and a plurality of access points. The WiFi-signal reader receives WiFi signals from access points and sends the detected WiFi signals to information relay unit 103. In another example, a Bluetooth-based positioning system includes a Bluetooth-signal reader and a plurality of Bluetooth beacons. The Bluetooth-signal reader receives the Bluetooth signals and sends the detected Bluetooth signals to information relay unit 103.

In an embodiment, information relay unit 103, based on received signals/data from the outdoor positioning sub-unit and the indoor positioning sub-unit, determines which signals/data are to be sent to control center 102. For example, when signals/data sent by the outdoor positioning sub-unit are weak or not available, information relay unit 103 determines the monitored personnel is in an indoor environment of the controlled environment and sends the signal/data from the outdoor positioning sub-unit to control center 102; when signals/data sent by the indoor positioning sub-unit are weak or not available, information relay unit 103 determines the monitored personnel is in an outdoor environment of the controlled environment and sends the signal/data from the indoor positioning sub-unit to control center 102. Information relay unit 103 has the ability to determine which signals/data are to be sent to control center 102 based on certain criteria, e.g., signal strength and signal availability. In some other embodiments, information relay unit 103 sends signals/data from both outdoor positioning sub-unit and indoor positioning sub-unit to control center 102. In some embodiments, information relay unit 103 switches between an "outdoor mode" and an "indoor mode", based on the received signals/data. In the outdoor mode, only the outdoor tracking function is available, and in the indoor mode, only the indoor tracking function is available.

After control center 102 receives the tracking signals/data from information relay unit 103, control center 102 simulates the location/position of the monitored personnel in the map of the controlled environment based on the received signals/data. Because control center 102 periodically receives real-time tracking signals/data, the simulation reflects the real-time status, e.g., path, location, movement, and/or dwelling time of the monitored personnel. Control center 102 has the option to utilize certain reference data stored in database 113 to calculate the location of the monitored subject. For example, when the monitored subject is in an indoor environment, control center 102 determines the location of a monitored personnel based on reference signal strength data and signal attenuation information. Control center 102 also includes suitable algorithm or model stored in database 113 to detect whether the status of the monitored personnel is abnormal, e.g., monitored personnel deviating from designed path, monitored personnel staying at a certain location for an abnormally long time, monitored personnel having a sudden body motion, and so on. In some embodiments, control center 102 responds to an abnormal status by triggering an alert or other actions.

Contraband signal detection unit 106 is bi-directionally connected to control center 102 through information relay unit 103 and includes hardware and software to detect unknown or forbidden wireless signals. Contraband signal detection unit 106 is configured to detect any wireless signals, e.g., WiFi hot spots, Bluetooth signals, and/or RF signals, not recognized or forbidden by multi-functional platform 101 or control center 102. For example, contraband signal detection unit 106 includes one or more wireless signal detectors that scan a wide range of signal frequencies, e.g., RF frequencies or cellular frequencies, to detect any unknown or forbidden wireless signals. Contraband signal detection unit 106 sends frequencies of detected signals to information relay unit 103. In one embodiment, information relay unit 103 forwards the received detected wireless signals to control center 102, and control center 102 compares the detected wireless signals to known and permitted wireless signals to determine whether contraband wireless signals are contained in the detected wireless signals. If a contraband wireless signal is detected, control center 102 sends a message or an alert to inform the monitored personnel a contraband frequency has been detected and prompts the monitored personnel to search for the contraband device.

Alert unit 107 is bi-directionally connected to control center 102 and includes software and hardware for alerting the monitored personnel or control center 102. In an embodiment, a monitored personnel has the option to trigger alert unit 107 so that control center 102 receives an alert from the monitored personnel. In another embodiment, control center 102 triggers alert unit 107 so that one or more monitored personnel receive the alert. An alert can be in the form of alarms, text messages, audio messages, etc.

Motion detection unit 108 is bi-directionally connected to control center 102 and includes software and hardware to detect sudden body motions of a monitored personnel and items that are out of place. In some embodiments, motion detection unit 108, including one or more motion sensors, sends a motion signal to control center 102 through information relay unit 103 when a sudden body motion of a monitored personnel is detected. Control center 102 sends a confirmation message to the monitored personnel. In an embodiment, if the monitored personnel responds to the confirmation message in a defined time period, the motion signal is disregarded; if the monitored personnel fails to respond to the confirmation message in the defined time period, control center 102 triggers other actions such as sending an alert to other monitored personnel informing the location of the monitored personnel failing to respond to the confirmation message. The confirmation message can be in the form of alert, text messages, audio messages, etc. In some embodiments, motion detection unit 108 also includes one or more motion detectors for detecting items not in their proper conditions. For example, motion detectors can detect doors, windows, and/or gates that are open but should be closed. The conditions of these items are recorded by multi-functional platform 101 and sent to control center 102 through information relay unit 103.

Monitoring unit 109 is bi-directionally connected to control center 102 and includes software and hardware to monitor activities of the monitored personnel. Monitoring unit 109 includes at least recording abilities, e.g., using cameras and/or microphones, to stream or record at a desired time. In an embodiment, the monitored personnel has the option to turn on the monitoring unit 109 to record a video. In an embodiment, control center 102 has the option to, e.g., when an abnormal status is detected, turn on monitoring unit 109 to start recording video and/or voice. In some embodiments, monitoring unit 109 can be turned off from both multi-functional platform 101 and control center 102. In some other embodiments, monitoring unit 109 cannot be turned off from multi-functional platform 101 when it is turned on from control center 102. In an embodiment, the monitored personnel has the option to locally store recorded content, e.g., video and/or audio data, or stream the recorded content in real-time to control center 102 through information relay unit 103. In another embodiment, control center 102 controls whether recorded content is to be locally stored or streamed. In some embodiments, monitoring unit 109 also monitors heart rate, respiration rate, and/or voice pitch of the monitored personnel and periodically sending heart rate data and voice data to control center 102 through information relay unit 103. Control center 102 periodically compares the heart rate data, respiration rate data, and/or voice data to pre-recorded normal heart rate sample, respiration rate sample, and/or voice sample, e.g., stored in database 113, to determine whether these data deviates from normal data. If control center 102 determines these data to be abnormal, control center 102 performs actions such as sending an alert to other monitored personnel and start video streaming from multi-functional platform 101.

Timing unit 110 is bi-directionally connected to control center 102 and includes software and hardware to record time elapsed and/or remained for an assignment/action. In an embodiment, timing unit 110 includes a clock or a timer. The monitored personnel or control center 102 has the authority to start counting time when an assignment, e.g., a walking and observing process, begins and stop counting time when the assignment finishes. If the monitored personnel does not finish the assignment on time, timing unit 110 sends an overdue signal to control center 102 through information relay unit 103, and control center 102 sends an alert to other monitored personnel or a confirmation message to the monitored personnel. In various embodiments, timing unit 110 also runs in the background for other functions. For example, when control center 102 sends an inquiry, e.g., text messages, confirmation message, and/or alert, to monitored personnel, timing unit 110 starts counting time elapsed for the inquiry and periodically sends time information to control center 102. If monitored personnel does not reply to the inquiry, control center 102 sends an alert to other monitored personnel or start video streaming from multi-functional platform 101. In various embodiments, real time and/or time elapsed/remained of an assignment are displayed to the monitored personnel.

Authentication unit 111 is bi-directionally connected to control center 102 and includes software and hardware to authenticate the identity of the monitored personnel. In an embodiment, authentication unit 111 prompts the monitored personnel to enter his/her identity-related information, such as PIN, SSN, legal name, and/or certain biometric samples, e.g., voice sample and retina scan sample, before allowing the monitored personnel to log in to multi-functional platform 101 and perform any assignment using multi-functional platform 101. Information relay unit 103 sends the received identity-related information to control center 102 so that control center 102 verifies entered identity-related information with pre-recorded information stored in database 113. The monitored personnel is given the option to attempt identity-related information a plurality times before control center 102 locks him/her out. When authentication fails, the monitored personnel needs to verify his/her identity and reactivate the locked multi-functional platform 101 at control center 102 or other authorized personnel. In some embodiments, a monitored personnel needs to re-identify himself/herself for certain assignments. For example, the monitored personnel is required to re-authenticate his/her identity in multi-functional platform 101 before him/her can send messages, alerts, and detect contraband wireless devices. The specific authentication methods for each assignment can be same or different, depending on, e.g., the convenience and reliability of different authentication methods.

Visualization unit 112 is bi-directionally connected to control center 102 and includes software and hardware to display data to the monitored personnel. In an embodiment, visualization unit 112 receives data from information relay unit 103 and visualizes the data in the form of text, graphics, images, and/or videos. In some embodiments, the data sent from information relay unit 103 to visualization unit 112 includes various data to be displayed to the monitored personnel. For example, current walking speed, path, time in the field, inmates nearby, inmates information, etc. Visualization unit 112 is programmed to visualize designated data for different hardware of visualization unit 112 such that multi-functional platform 101 displays data properly on proper hardware. In some embodiments, control center 102 controls the type of data to be displayed by different hardware and visualization unit 112 processes the data accordingly to a suitable format for each designated hardware to be displayed. In some embodiments, data visualized by visualization unit 112 includes recordings of physical objects of real-world and computer-generated visuals.

In some embodiments, a third party 115 is bi-directionally connected to control center 102 to communication with control center 102 and obtain certain data, e.g., monitoring data, positioning data, etc., of the monitored personnel. The data can include non-real-time data such as text or emails and/or real-time data such as voice calls and video calls. In some embodiments, third party 115 needs to be authorized to get access to control center 102. In some embodiments, third party 115 connects to multi-functional platform 101 when the monitored personnel carrying multi-functional platform 101 is in an assignment. Third party 115 accesses real-time data received and streamed by multi-functional platform 101 through control center 102. In some embodiments, data transmission between third party 115 and control center 102 is encrypted. In some embodiments, third party 115 includes an external device, e.g., a USB device or a mobile device. In some embodiments, third party 115 monitors activities of the monitored personnel through control center 102 and has real-time communication with multi-functional platform 101 and control center 102 during the monitoring session.

In some embodiments, the bi-directional connection between units in the present disclosure includes any suitable bi-directional wired (e.g., Ethernet) connection or wireless connection. The wireless connection can be implemented as one or more of a wide-area network (WAN) connection, a local area network (LAN) connection, the Internet, a Bluetooth connection, an RF connection, and/or an infrared connection. Other types of implementations for a wired or wireless connection are possible without deviating from the scope of the present disclosure.

In various embodiments, at least some functions of control center 102 can be integrated or replicated into multi-functional platform 101. In an embodiment, information relay unit 103 is connected to or includes a control unit (not shown) and an internal database (not shown) similar to control center 102 and database 113. Control unit extracts data from the internal database and perform certain functions in response to received signals/data. For example, control unit determines to trigger an alert to control center 102 when the monitored personnel fails to reply to a message in a predetermined time period. In another example, multi-functional platform 101 stores a map of the controlled environment, and control unit determines to trigger an alert to control center 102 when the monitored personnel's path deviates from the designed path. In another example, control unit determines different data to be visualized and displayed on different displays of multi-functional platform 101. In certain embodiments, some functions are executed on multi-functional platform 101 and other functions are executed through control center 102. The actual allocation of work load or functions between multi-functional platform 101 and control center 102 are subjected to different design requirements and preferences.

For illustrative purposes, in the present application, only one multi-functional platform 101 is shown for the description of communication system 100. In various different embodiments, control center 102 can also be connected to a plurality of multi-functional platforms 101 and facilitate communication among different multi-functional platforms 101. In an example, inquiries from one multi-functional platform 101 is routed by control center 102 to a desired receiving multi-functional platform 101. Control center 102 monitors the communication among all connected multi-functional platforms 101 and controls all connected multi-functional platforms 101.

Multi-Functional Platform

Figure 2:
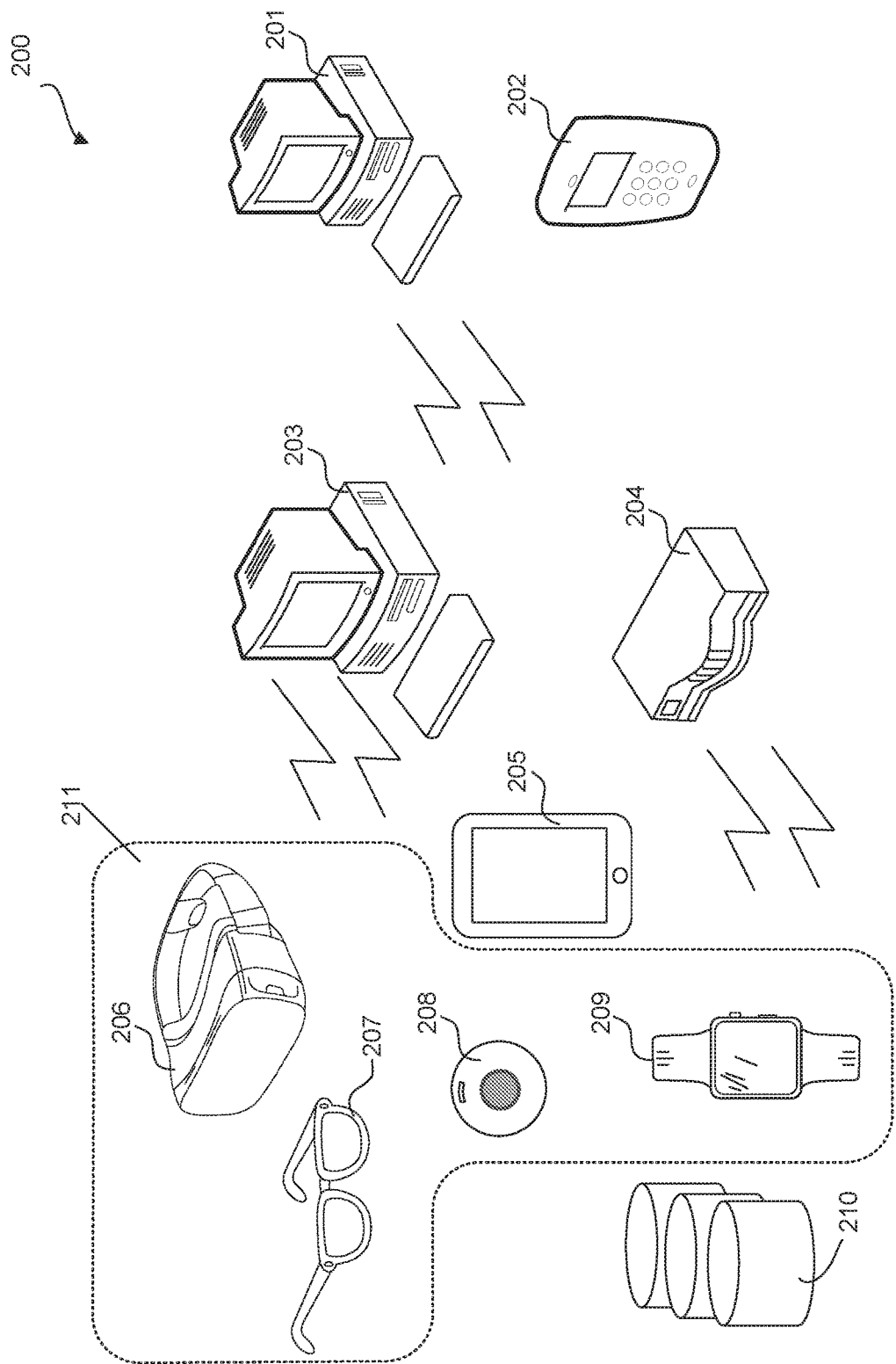
FIG. 2 illustrates elements of a communication system for guards of a controlled environment, according to embodiments of the present disclosure.

FIG. 2 illustrates elements of communication system according to embodiments of the present disclosure. In an embodiment, communication system 200 includes a server 201 as control center and database, and a portable device 202 as third party connected to control center. In some embodiments, communication system 200 includes one or more of a computer station 203, a data routing device 204, a portable device 205, an AR devices 211, and a plurality of wireless positioning signal transmitters 210 in multi-functional platform 101. In some embodiments, AR devices 211 includes one or more of an AR headset 206, an AR glasses 207, an AR contact lenses 208, and an AR wearable device 209. In some embodiments, computer station 203 and data routing device 204 (e.g., gateway or router) facilitates data transmission between one or more of devices 205-209 and control center 102 (illustrated in FIG. 1).

In some embodiments, portable device 205 is configured to display current status of the monitored personnel and facilitates communication between control center 102 and the monitored personnel that carries portable device 205. In some embodiments, portable device 205 has wired (e.g., USB cable connection) and/or wireless (e.g., Bluetooth or Wi-Fi connection) communication capabilities. In an embodiment, portable device 205 receives positioning information from the plurality of wireless positioning signal transmitters 210 and communicates with control center 102 through data routing device 204 and/or computer station 203 to determine the real-time location of portable device 205 and status information of the monitored personnel. In some embodiments, portable device 205 also sends certain received data to control center 102 to be processed. In some embodiments, portable device 205 facilitates communication between AR devices 211 and control center 102. Portable device 205 can be in the form of a smart device, e.g., tablet, smart phone, etc.

In some embodiments, AR devices 211, e.g., devices 206-209, display augmented reality to the monitored personnel. In some embodiments, AR devices 211 display the physical objects in the surroundings of the monitored personnel and augmented reality element together with the physical objects to supplement certain information. For example, AR devices 211 display the surroundings, the inmates in the surroundings, and certain profile information of the detected inmates. In some embodiments, surroundings recorded by AR devices 211 are transmitted to portable device 205 and/or control center 102. In some embodiments, through data routing device 204 and/or computer station 203, AR devices 211 operates and communicates with control center 102 separately from portable device 205. In some embodiments, the operation of AR devices 211 is connected with the operation of portable device 205, and AR devices 211 communicates with control center 102 through portable device 205. In some embodiments, control center 102 has the capability to control one or more of AR headset 206, AR glasses 207, AR contact lenses 208, and AR wearable device 209. In some embodiments, the monitored personnel, carrying portable device 205 and one or more of AR devices 211, controls these devices through portable device 205. In some embodiments, the monitored personnel is able to separately control each one of the AR devices 211.

Figure 3:
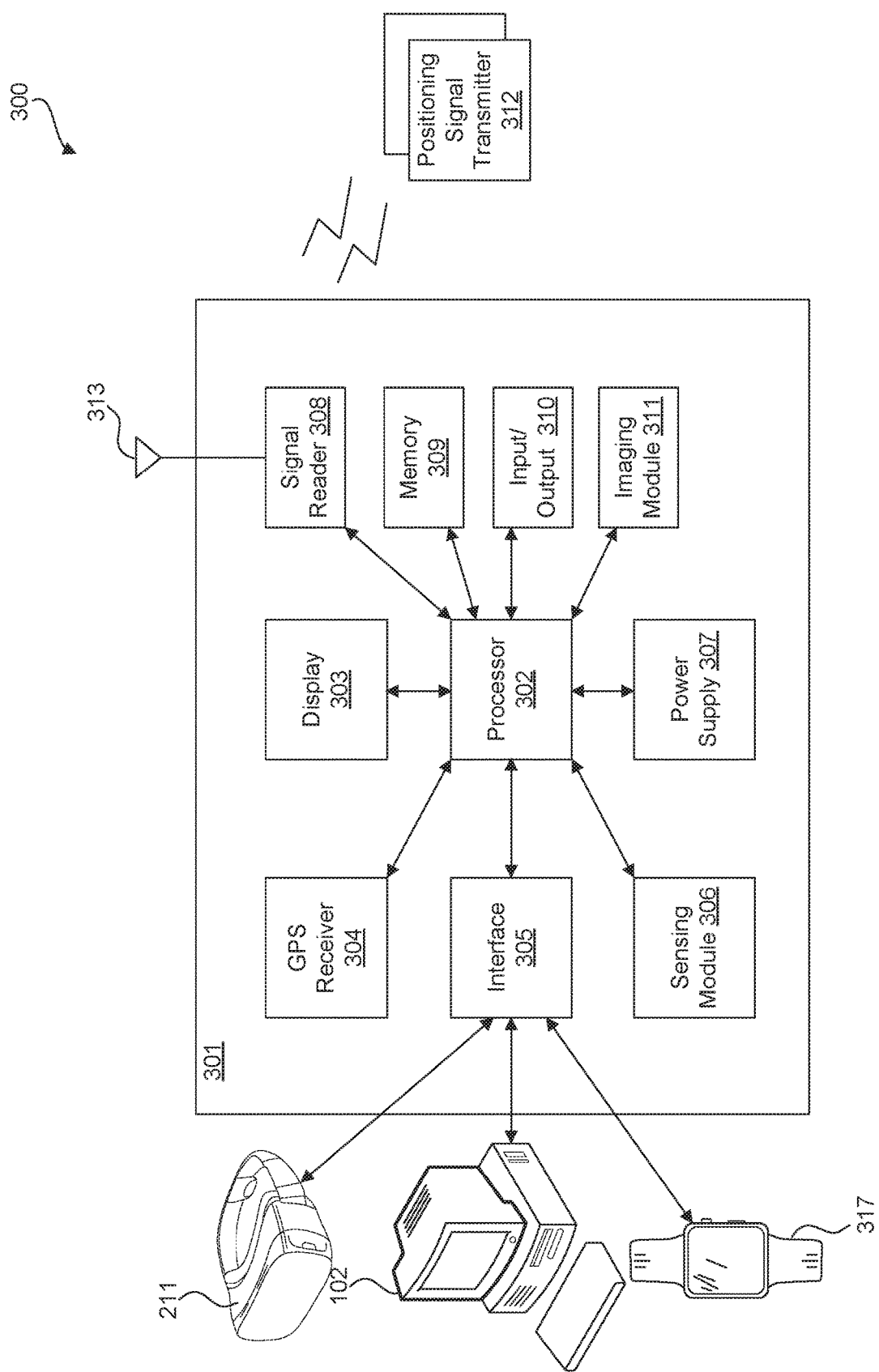
FIG. 3 illustrates a block diagram of a portable device for guards of a controlled environment, according to embodiments of the present disclosure.

FIG. 3 illustrates a block diagram 300 of portable device 301 in communication with other devices in multi-functional platform 102, according to embodiments of the present disclosure. Portable device 301 is same as or similar to portable device 205 illustrated in FIG. 2. In an embodiment, portable device 301 communicates with one or more positioning signal transmitters 313 distributed in the controlled environment to obtain positioning information to control center 102 (shown in FIG. 1) so that control center 102 receives real-time updates, e.g., path, moving speed, dwelling time, conversations, heart rate, and/or surroundings, of the monitored personnel carrying portable device 301. Portable device 301 can be any suitable portable device, e.g., a mobile phone, a tablet, and/or a laptop computer. Portable device 301 can be carried at a convenient position of the monitored personnel's body for ease of use.

In some embodiments, portable device 301 includes a processor 302, a display 303, a GPS receiver 304, an interface 305, a sensing module 306, a power supply 307, a signal reader 308, a memory 309, an input/output 310, an imaging module 311, and an antenna 313. In the present disclosure, directions of arrows reflect the directions of data/signal flow. The connection between different parts of portable device 301 includes any suitable wired (e.g., Ethernet) connection or wireless connection. The wireless connection can be implemented as one or more of a wide-area network (WAN) connection, a local area network (LAN) connection, the Internet, a Bluetooth connection, and/or an infrared connection. Other types of implementations for a wired or wireless connection are possible without deviating from the scope of the present disclosure.

Processor 302 receives signals/data from different parts of multi-functional platform 101, processes these signals/data, and respond accordingly. In some embodiments, processor 302 is also programmed to control the operations of other parts of portable device 301 and certain other parts, e.g., AR devices 211, of multi-functional platform 101. Memory 309 stores any necessary data for calculation of processor 302. In an embodiment, memory 309 stores at least a portion of the data stored in database 113. Interface 305 includes any suitable data transmission devices for transmitting data between portable device 301 and control center 102/other devices. For example, interface 305 is configured to communicate with other systems/devices, e.g., AR devices 211, control center 102, and other devices 317, outside of portable device 301. Devices 317 represents any other devices, inside or outside of communication system 100, capable of communicating with portable device 301. Power supply 307 provides power to other parts of portable device 301. Input/output 310 includes any suitable devices for receiving input data, e.g., type-in messages, voice messages, scanned images, etc., and outputting data generated by portable device 301. Display 303 includes any suitable display devices such as light-emitting diode (LED) display and/or liquid-crystal display (LCD) devices for displaying any text, graphics, images, and/or videos determined by processor 302.

GPS receiver 304 provides location information, e.g., coordinates, of the monitored personnel carrying portable device 301, when GPS signals are available. For example, when the monitored personnel is in an outside environment of the controlled environment, GPS receiver 304 sends current coordinates of the monitored personnel to processor 302. In an embodiment, processor 302 processes the data, extracts the map stored in memory 309, and simulates the current location of the monitored personnel in the map. Processor 302 also encrypts the coordinates and sends the encrypted coordinates to control center 102 (shown in FIG. 1) through interface 305. Meanwhile, processor 302 displays the map and the current location, path, moving speed, and/or dwelling times of the monitored personnel, along with the map in display 303. Processor 302 also responds accordingly based on the current status of the monitored personnel. For example, processor 302 determines whether abnormal activities have been detected and notifies the monitored personnel if abnormal activities have been detected. In an embodiment, processor 302 sends an alert to control center 102 when abnormal activities are detected.

Sensing module 306 includes one or more suitable sensors, integrated or separate, for detecting biometric features, heart rate, body motion, etc. For example, sensing module 306 includes a camera, a fingerprint scanner, a retina scanner, a heart rate sensor, and/or a body motion sensor. Sensed signals are sent to processor 302 to be processed. Processor 302 analyzes the sensed data and determines whether any abnormal activities occur. For example, processor 302 detects whether data reflecting a sudden change in heart rate and/or body motion is contained in the sensed data. In an example, biometric sensors are used for authenticating the identity of the monitored personnel and/or identify inmates/other personnel. For example, an inmate's biometric samples can be recorded and sent to control center 102 for analysis and/or recording purposes.

Signal reader 308 includes one or more devices, integrated or separate, for detecting suitable wireless signals. In an embodiment, signal reader includes one or more antennas, represented by element 313 in FIG. 3. Signal reader 308 is configured to, in a detectable distance, detect any wireless positioning signals, any wireless identification signals, and/or any wireless communication signals. In an embodiment, wireless positioning signals include positioning signals used in various positioning systems such as RF signals, Bluetooth signals, WiFi signals, ultrasonic signals, etc. Wireless identification signals include signals emitted by ID tags or devices, such as RFID worn by inmates, and ID signals emitted by electronic devices. Wireless communication signals include any cellular or WiFi signals transmitted by electronic devices, such as cellular signals transmitted by a mobile device. In some embodiments, signal reader 308 scans a wide range of frequencies and sends detected signals to processor 302. In some embodiments, processor 302 has the option to encrypt detected wireless signals and send them to control center 102 for further analysis. In an embodiment, processor 302 also calculates/analyzes detected signals.

In some embodiments, processor 302 recognizes the types of detected signals based on the frequencies of the detected signals. If the signals are wireless positioning signals, processor 302 calculates the location/position of the monitored personnel based on certain parameters, e.g., strengths of signals, and reference data, stored in memory 309. Signal reader 308 detects positioning signals of one or more positioning methods, transmitted from different positioning signal transmitters 312 located at same or different nearby places. Processor 302 calculates the location under different positioning methods. In some embodiments, processor 302 has the option to select one location with the highest precision, or supplement different positioning methods using one another to obtain a corrected location. In an embodiment, processor 302 simulates the location of the monitored personnel and display 303 displays the real-time status, e.g., path, location, moving speed, and/or dwelling time in the map of the controlled environment. Processor 302 also responds accordingly based on the current status of the monitored personnel. For example, processor 302 determines whether abnormal activities have been detected and notifies the monitored personnel if abnormal activities have been detected. In an embodiment, processor 302 sends an alert to control center 102 when abnormal activities are detected.

If the detected signals contain wireless identification signals, processor 302 extracts identification information from the signals and determines the location or proximity of objects/subjects transmitting the identification signals based on current location and information contained in the identification signals. In an embodiment, processor 302 simulates the locations/proximities of the objects/subjects and display 303 displays the real-time status, e.g., locations/proximities and moving speed in the map of the controlled environment. Processor 302 also responds accordingly based on the current status of the detected objects/subjects. For example, processor 302 determines sending an alert to control center 102 when abnormal activities, e.g., objects/subjects being at forbidden locations/proximities, are detected.

If the detected signals contain wireless communication signals, processor 302 extracts unknown or forbidden communication signals from the detected signals. Based on the location and proximity information determined, processor 302 also determines the location/proximity of a contraband wireless communication signal and display the contraband wireless communication signal at the location/proximity it's detected, in the map. In an embodiment, processor 302 notifies the monitored personnel the detection of any contraband wireless communications and sends the detection result to control center 102.

In an embodiment, the detected signals contain wireless communication signals and/or wireless identification signals of multi-functional wireless devices that are assigned to inmates. These multi-functional wireless devices allow inmates to wirelessly communicate with personnel of the controlled environment and/or contacts outside of the controlled environment. The wireless signals of a multi-functional wireless device contains the location restriction information of the multi-functional wireless device. For example, the wireless signals can indicate the area the multi-functional wireless device is permitted to be positioned. If it is detected that the multi-functional wireless device is positioned at a forbidden location, processor 302 notifies the monitored personnel and/or control center 102 the detection of a forbidden multi-functional wireless device in a nearby area. In an example, a multi-functional wireless device, which is only allowed to be located in cell/room 2 and the public dining area, is detected to be in cell 4. Accordingly, processor 302 notifies the monitored personnel and/or control center 102 the multi-functional wireless device is violating the rules and is located in cell 4.

In another embodiment, when a multi-functional wireless device is detected to be at a forbidden area, the monitored personnel and/or control center 102 have the option to remotely activate the covert features of the multi-functional wireless device, e.g., automatically streaming certain data such as audio, video, location information, and current usage of the multi-functional wireless device, to portable device 301 and/or control center 102 without notifying the inmate using the multi-functional device. In some embodiments, the monitored personnel and/or control center 102 can activate the covert features of any detected multi-functional wireless device detected in the nearby areas.

Imaging module 311 includes any suitable devices for recording and streaming images and videos, e.g., camera and/or infrared camera. The monitored personnel and control center 102 have the ability to control the functioning of imaging module 311. The monitored personnel and control center 102 turn on imaging module 311 at a desired time. In some embodiments, when an abnormal activity is detected, control center 102 and/or portable device 301 automatically turn on imaging module 311 to start recording or streaming.

Positioning signal transmitters 312 include any suitable passive and active signal transmitters for transmitting wireless signals that can be used for calculating the location/position of the monitored personnel. Positioning signal transmitters 312 include transmitters of one or more types of positioning methods. In an example, positioning signal transmitters 312 include one or more of RF tags, Bluetooth beacons, WiFi access points, ultrasonic transmitters, etc. Positioning signal transmitters 312 are distributed in desired locations to conveniently transmit positioning signals to portable device 301. Antenna 313 represents any suitable number of signal receivers necessary to detect the positioning signals.

In various embodiments, portable device 301 automatically switches from "indoor mode" to "outdoor mode" when GPS signals are sufficiently strong and positioning signals are weak, and vice versa. Control center 102 and/or monitored personnel also have the authority to select one or more positioning methods on the portable device 301. In some embodiments, control center 102 selects GPS positioning to be supplemented with other positioning methods to provide positioning information of desirable precision.

In various embodiments, portable device 301 periodically sends detected/sensed signals/data to control center 102 for analysis and updates. Accordingly, control center 102 determines the response to any inquiry from portable device 301. In some embodiments, portable device 301 analyzes and responds to certain signals/data without inquiring control center 102. In an example, portable device 301 stores the map of the controlled environment and simulates the current path, location, and/or moving speed of the monitored personnel in the map based on positioning data. When an abnormal activity is detected, an alert is sent to the monitored personnel and/or control center 102. Meanwhile, portable device 301 sends positioning data to control center 102 so that control center 102 updates and monitored current status of the monitored personnel.

In various embodiments, portable device 301 communicates with one or more of AR devices 211 to control the functions of these AR devices 211. In some embodiments, control center 102 controls one or more of these AR devices 211 through portable device 301. For illustrative purposes, an AR headset is described as an example for AR devices 211.

Figure 4A:
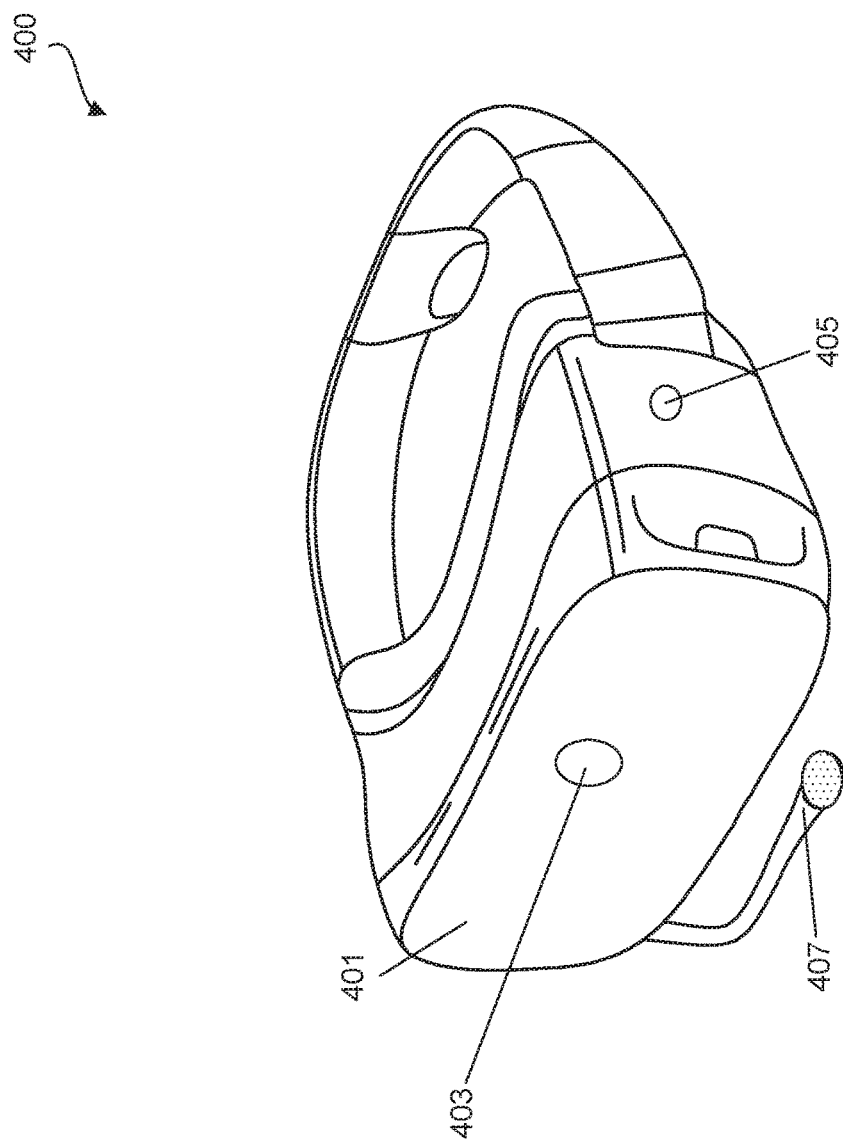
FIG. 4A illustrates an augmented reality (AR) device for guards of a controlled environment, according to embodiments of the present disclosure.
Figure 4B:
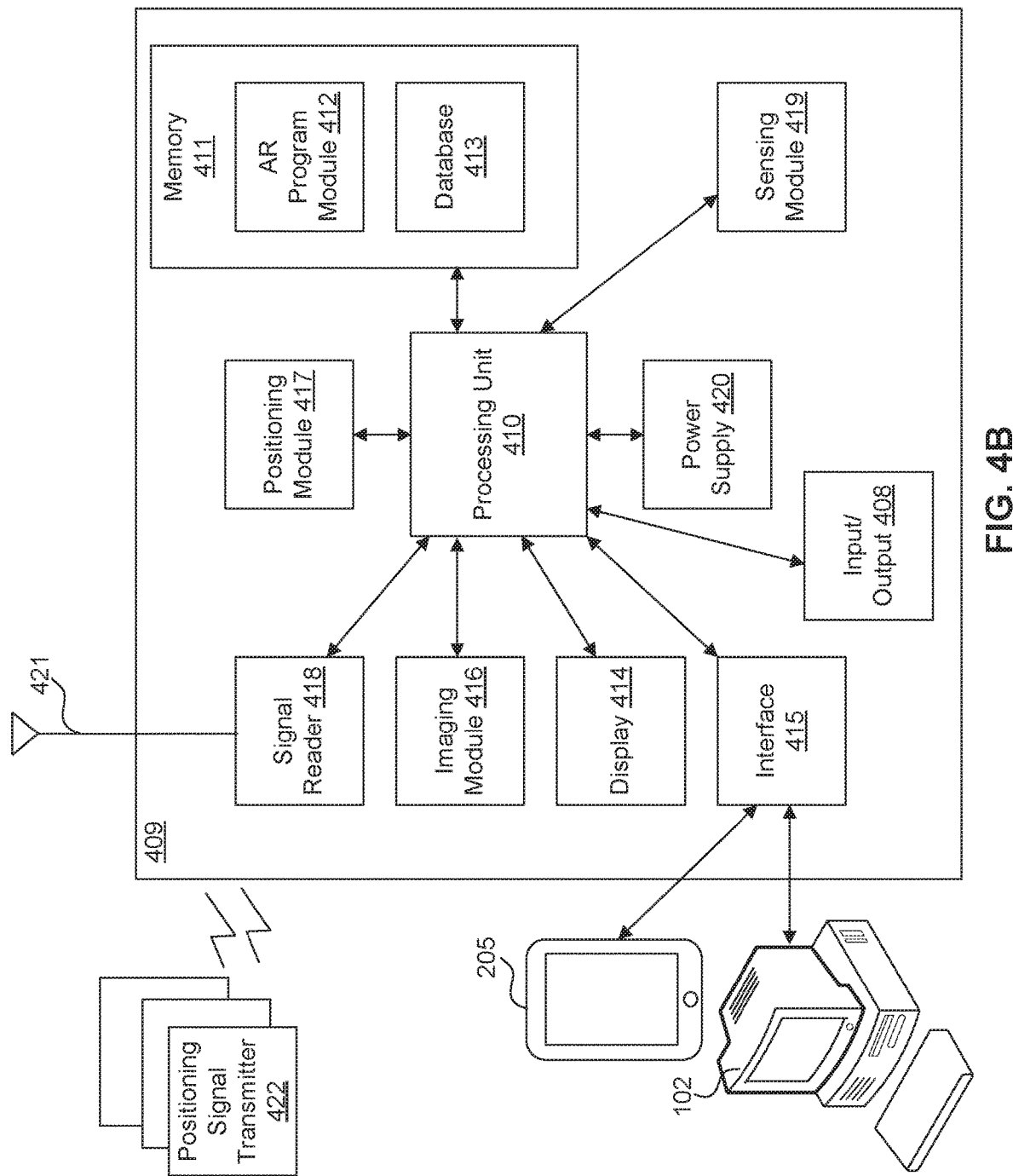
FIG. 4B illustrates a block diagram of the AR device for guards of a controlled environment, according to embodiments of the present disclosure.

FIG. 4A illustrates an exemplary AR headset 400, and FIG. 4B illustrates a block diagram of the AR headset 400, according to embodiments of the present disclosure. In some embodiments, AR headset 400 is installed with software and hardware to be controlled by control center 102 through portable device 301. In some embodiments, AR headset 400 is installed with software and hardware to communicate with control center 102 independently.

As shown in FIG. 4A, in some embodiments, AR headset 400 includes a pair of lenses/optics 401, a headband 402, a front camera 403, and a processor 409. In some embodiments, headband 402 enables a monitored personnel to wear AR headset 400 on his/her head at a proper position/orientation so the monitored personnel is able to see images and/or videos displayed by lenses 401, where lenses 401 display the images and/or videos to the monitored personnel wearing AR headset 400. Front camera 403 captures the front view of the monitored personnel and sends the captured data to processor 400 for processing and/or further transmission. In some embodiments, AR headset 400 further includes a microphone 407 for receiving the monitored personnel's voice responses/instructions.

In some embodiments, front camera 403, e.g., an outward facing visible-light camera, captures a wide angle of the front view. In some embodiments, front camera 403 stays on during the assignment or is turned on by monitored personnel and/or control center 102 at any time during an assignment.

In some embodiments, AR headset 400 further includes a rear camera 406 (not showing in FIG. 4A), facing outward, for capturing a rear view of the monitored personnel. In some embodiments, rear camera 406 includes a short-wavelength infrared camera. In some embodiments, the infrared camera is turned on when infrared radiation (e.g., infrared radiation emitted by humans) is detected and starts recording the rear view in infrared images/videos. In some other embodiments, rear camera 406 includes an infrared sensor and a visible-light camera. When the infrared sensor detects infrared radiation, the visible-light camera starts recording images/videos. The monitored personnel, control center 102, and/or portable device 301 have the option to choose which camera to use, e.g., based on different assignments. Accordingly, AR headset 400 starts displaying real-time images/videos captured by the rear camera to the monitored personnel when infrared radiation is detected.

In some embodiments, AR headset 400 further includes one or more side cameras, facing outward. For example, AR headset 400 can include side cameras, e.g., 404 and 405, on the left and right sides of AR headset 400. For illustrative purposes, side camera 405 is shown on AR headset 400. Side cameras 404 and 405 can each be a visible-light camera or a short-wavelength infrared camera. The operation of side cameras 404 and 405 can be referred to the operation of front camera 403 and rear camera 406. In some embodiments, front camera 403, rear camera 406, and side cameras 404 and 405 together capture an angle of 360° around the monitored personnel so that the monitored personnel is able to monitor the entire surroundings at the same time.

In some embodiments, AR headset 400 includes real-time facial recognition functions. In some embodiments, when AR headset 400 detects a human's face in the images/videos, AR headset 400 captures the facial features of the detected object and compares the facial features with stored facial features or sends the facial features to portable device 301 and/or control center 102 for comparison. After the objected has been recognized, AR headset 400 further displays augmented reality element such as the identity and other related profile information of the object to the monitored personnel in real-time. For example, when the object is detected to be an inmate, AR headset 400 displays the profile data such as the name, inmate ID number, offense history, contact history, reason of incarceration, cell number of the inmate together with the real-time images/videos of the inmate. In some embodiments, when the object is detected to have significant offense history, e.g., felony or having violence history with guards, an augmented reality alert is displayed to the monitored guard. In some embodiments, the real-time facial recognition function is only applied on the rear view. In some embodiments, the real-time facial recognition function is applied on one or more of the front view, the rear view, and the side views, depending on the selection by the monitored personnel, control center 102, and/or portable device 301.

FIG. 4B illustrates a block diagram of processor 409 of AR headset 400, according to embodiments of the present disclosure. In some embodiments, processor 409 includes an input/output 408, a processing unit 410, a power supply 420, an imaging module 416, a display 414, an interface 415, a memory 411, an AR program module 412, a database 413, a sensing module 419.

Input/output 408 is bi-directionally connected to processing unit 410 and includes circuitry such as a microphone, keyboard, and cameras. One or more cameras, outward facing as illustrated in FIG. 4A, are utilized for capturing visual information regarding the physical environment being viewed by the monitored personnel. Information from these outward facing cameras is provided to processing unit 410. In some embodiments, AR headset 400 further includes one or more inward facing cameras, utilized to capture biometric information of the monitored personnel. Biometric information may be authenticated by AR headset 400, portable device 301, and/or control center 102. Input/output unit 310 may be used to enter or output, e.g., audio, images, video, and/or text.

Sensing module 419 is bi-directionally connected to processing unit 410. Sensing module 419 is configured to for detecting various patterns such as biometric features and items out of place. In an example, sensing module 419 utilizes inputs received from input/output 408 to authenticate the identity of the monitored personnel and/or to recognize items in abnormal conditions. In some embodiments, AR headset 400 is installed with pattern recognition functions, and sensing module 419 is configured to recognize items in abnormal conditions, e.g., doors/windows/gates that are open but should be closed. In an example, biometric sensors are used for authenticating the identity of the monitored personnel and/or identify inmates/other personnel. For example, an inmate's biometric samples can be recorded and sent to control center 102 for analysis and/or recording purposes.

In some embodiments, input/output 408 and/or sensing module 419 receives various types of inputs, e.g., eye movements, head movements, and type-ins, and converts these inputs to input signals to be sent to processing unit 410. In some embodiments, input/output 408 includes various sensors, e.g., motion sensors, for detecting movements of certain body parts of the monitored personnel such that processing unit 410 determines the response of AR headset 400 to the input. For example, eye movement of the monitored personnel can be monitored through an inward facing camera. Eye movement of the personnel can operate much like a mouse by following the eye movement moving a cursor and utilizing the blinks of the eyes to select an item (i.e., similar to a mouse click). This allows for the entry of alpha numeric or the selection of items from the display without the personnel having to use his fingers or hands. Input/output circuitry further includes a projector and other sensors for aligning the augmented reality element that is displayed as, for example, a graphical overlay, in relation to the physical real-world objects. Input/output 408 coordinates with processing unit 410 to adjust the display of the augmented reality element based on personnel's head movements and the new physical objects being viewed by input/output 408 (e.g., an outward facing camera).

Processing unit 410 processes data and inquiries received from other parts of processor 409 and controls the operation of AR headset 400. In some embodiments, processing unit 410 coordinates the operation of AR headset 400 with portable device 301 and/or control center 102. In some embodiments, processing unit 410 determines the data being processed by AR headset 400, the data sent to portable device 301, and the data sent to control center 102. In some embodiments, processing unit 410 also coordinates inquiries sent from portable device 301 and/or control center 102. For example, processing unit 410 determines the data, e.g., positioning data and/or inmate information, that can be obtained from portable device 301 and/or control center 102 for calculation or display. In some embodiments, processing unit 410 determines how data is visualized to the monitored personnel. For example, processing unit 410 determines real-time videos recorded from different angles are arranged when displaying them to the monitored personnel. In another example, processing unit 410 determines the arrangement of augmented reality element versus physical objects when displaying them to the monitored personnel, e.g., arranging the augmented reality element as an overlay over the corresponding physical objects.

Display 414 is bi-directionally connected to processing unit 410 and displays augmented reality element versus physical objects that the monitored personnel is currently looking at or within a physical environment of the personnel. In an embodiment, input/output 408 interacts with AR headset 400 to project the augmented reality element for viewing by the monitored personnel. AR headset 400 provides an unobstructed clear view of the personnel's current environment while also displaying the augmented reality element. As an example, the augmented reality element may be output by input/output 408 as a transparent graphical overlay through AR headset 400.

Interface 415 is bi-directionally connected to processing unit 410 and includes one or more transceivers, transmitters, and/or receivers that communicate via a wireless interface, such as through one or more antennas, or a wired interface, such as through a USB cable. In an embodiment, interface 415 is configured to transmit and receive communications between AR headset 400 and of portable device 301 and/or between AR headset 400 and control center 102. In some other embodiments, interface 415 is also configured to communicate with other devices. In an embodiment, interface 415 connects AR headset 400 with other devices such as a mobile device and/or external input devices such as a keyboard, mouse, camera, or touch interface.

Imaging module 416 is bi-directionally connected to processing unit 410 and includes any suitable imaging devices such as visible-light cameras and infrared cameras for capturing the surroundings of the monitored personnel. In some embodiments, the cameras have sufficiently high resolution for facial features of objects to be captured. Power supply 420, e.g., batteries, provides power to various parts of AR headset 400.

Memory 411 is bi-directionally connected to processing unit 410 and includes AR program module 412 and database 413. In some embodiments, memory 411 is a machine-readable medium, e.g., read only memory (ROM), random access memory (RAM), magnetic disk storage media, optical storage media, flash memory devices, electrical, optical, acoustical or other forms of propagated signals (e.g., carrier waves, infrared signals, digital signals, etc.), and others. AR program module 412 includes suitable programs for generating augmented reality element. Database 413 includes any suitable data that can be used by AR headset 400. In some embodiments, database 413 is stored with authentication data of inmates and personnel, augmented reality data, and/or positioning data. In some embodiments, AR program module 412 utilizes augmented reality data in database 413 to generate augmented reality element. In some embodiments, database 413 contains at least a portion of data contained in database 113. In some embodiments, portable device 301 and/or control center 102 include suitable software, hardware, and data for AR information generation. In some embodiments, processing unit 410 obtains AR information generated by portable device 301 and/or control center 102 to be displayed by AR headset 400.

In some embodiments, AR headset 400 further includes a positioning unit 417 and a signal reader 418, each bi-directionally connected to processing unit 410. In some embodiments, signal reader 418 includes an antenna 421. In some embodiments, positioning unit 417 includes positional and motion sensors for determining a current location of AR headset 400 as well as the current position and orientation of the personnel's head. In some embodiments, positional and motion circuitry includes such circuitry as GPS technology, indoor positioning systems (IPS) technology, accelerometers, and/or gyroscopes to determine position and motion of AR headset 400 and position and/or orientation of the monitored personnel's head. In some embodiments, IPS technology utilizes GPS positioning information and wireless positioning signals emitted by positioning signal transmitters 422 and received by signal reader 418 and antenna 421 to determine the real-time position/location of AR headset 400. In some embodiments, positioning signal transmitters 422 are same as or similar to positioning signal transmitters 313. The working mechanism of signal reader 318, antenna 421, and the indoor and outdoor positioning functions of positioning unit 417 can be referred to the working mechanism of portable device 301.

Figure 4C:
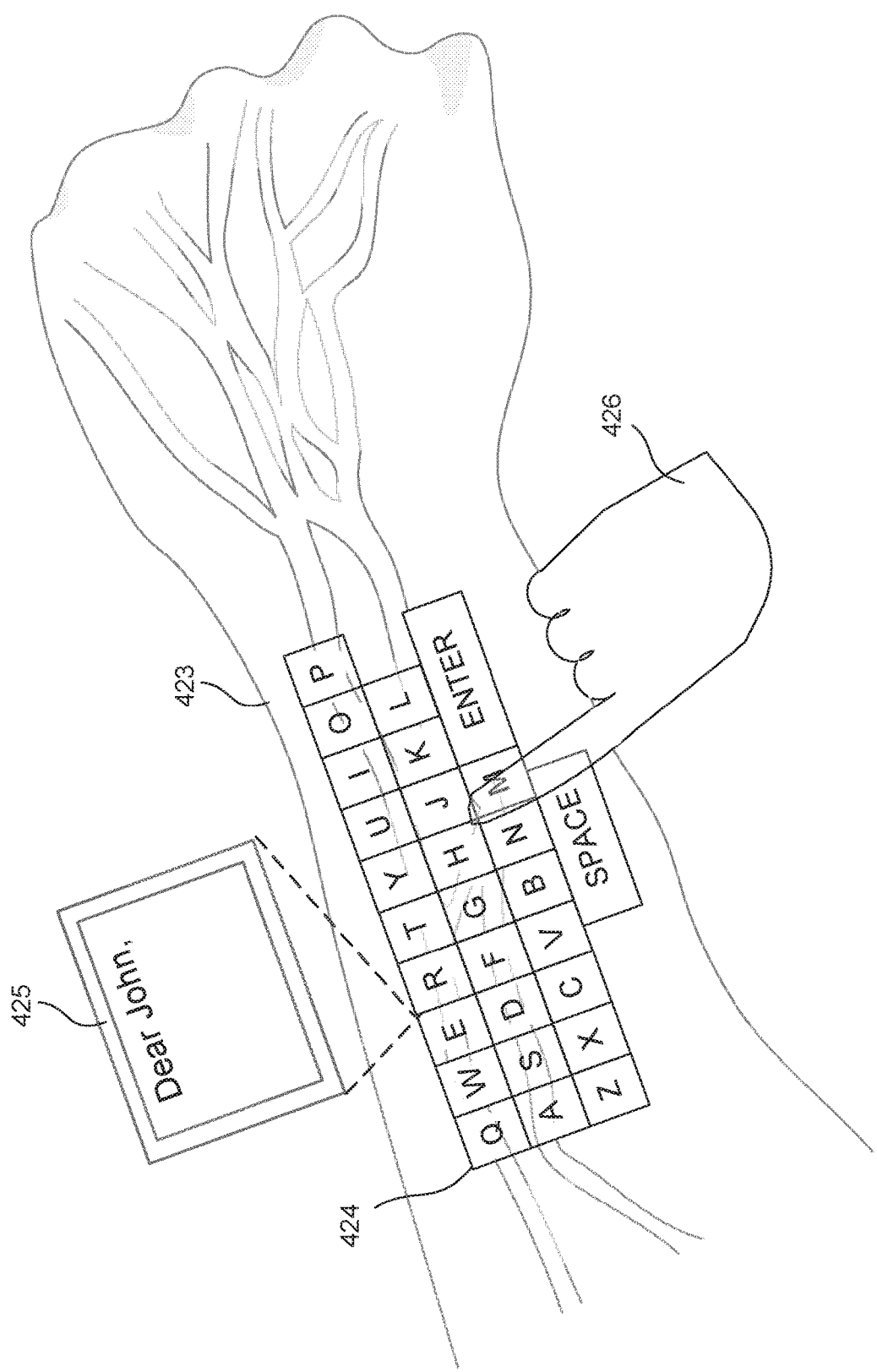
FIG. 4C illustrates an exemplary interface for displaying an augmented reality input interface using the wearable device, according to embodiments of the present disclosure.

In some embodiments, AR headset 400 is capable of displaying an augmented reality input interface, according to embodiments of the present disclosure. In some embodiments, For example, as shown in FIG. 4C, AR headset 400 provides a virtual keyboard that is displayed as if it were on a detected surface. As shown in FIG. 4C, in an embodiment, AR headset 400 detects that the monitored personnel is looking at his arm 423 based on image recognition techniques performed at AR headset 400. Upon detecting arm 423, AR headset 400 determines that the monitored personnel would like an input device to interact with multi-functional platform 101 and displays augmented reality input interface 424 which is displayed by AR headset 400. Augmented reality input interfaces are another type of augmented reality element and can be similarly implemented as a graphical overlay over a physical real-world object. In some embodiments, augmented reality element 425 is configured to display a communication that the monitored personnel wishes to send such as an email.

Accordingly, augmented reality element 425 can concurrently display augmented reality input interface 424 on the monitored personnel's detected arm as well as augmented reality element 425. In this manner, the monitored personnel can utilize augmented reality input interface 424 to input text or otherwise interact with content displayed in augmented reality element 425. The monitored personnel may utilize another input device to interact with augmented reality input interface 424. As one example, the monitored personnel may use his/her hand 426 to point to specific points of augmented reality input interface 424 to select letters to input into augmented reality element 425. Other means to interact with augmented input interface 424 include voice commands. For example, the personnel says "A." Accordingly, AR headset 400 records the voice command and recognizes it as an input for augmented input interface 424. AR headset 400 then selects "A" and displays it on augmented reality element 425. In some embodiments, the input is sent to one or more of AR headset 400, portable device 301, and control center 102.

In some embodiments, similar to portable device 301, AR headset 400 is able to detect nearby multi-functional wireless devices and stream certain files to control center 102. In some embodiments, AR headset 400 displays the result of detection obtained from portable device 301. In some embodiments, AR headset 400 displays the streamed files, e.g., audio, video, location information, and current usage of the multi-functional wireless devices to the monitored personnel in real-time. In some embodiments, control center 102 is capable of recording the streamed files from portable device 301 and/or AR headset 400. In some embodiments, third party 115 is capable of receiving the real-time streaming of files and recording the files through control center 102.

In some embodiments, AR headset 400 automatically captures the facial features of each inmate as the monitored personnel, wearing AR headset 400, passes the residential area, e.g., cell, of the inmate. AR headset 400 automatically performs a facial recognition of the facial feature of each inmate and obtains the information related to the identity of the inmate. For example, AR headset 400 automatically displays the information of the inmate upon the detection of the inmate's identity. In some embodiments, the information includes name, birthday, offense history, reasons for incarceration, and contact history of an inmate. Other information can also be displayed. In some embodiments, AR headset 400 captures the facial features of inmates through one or more of the front camera, the side cameras, and the rear camera. In some embodiments, AR headset 400 streams the captured images/videos to control center 102. In some embodiments, AR headset 400 streams the captured images/videos to third party 115 through control center 102. In some embodiments, AR headset 400 and/or control center 102 can monitor the inmates in real-time and/or record the streamed images/videos.

Figure 5:
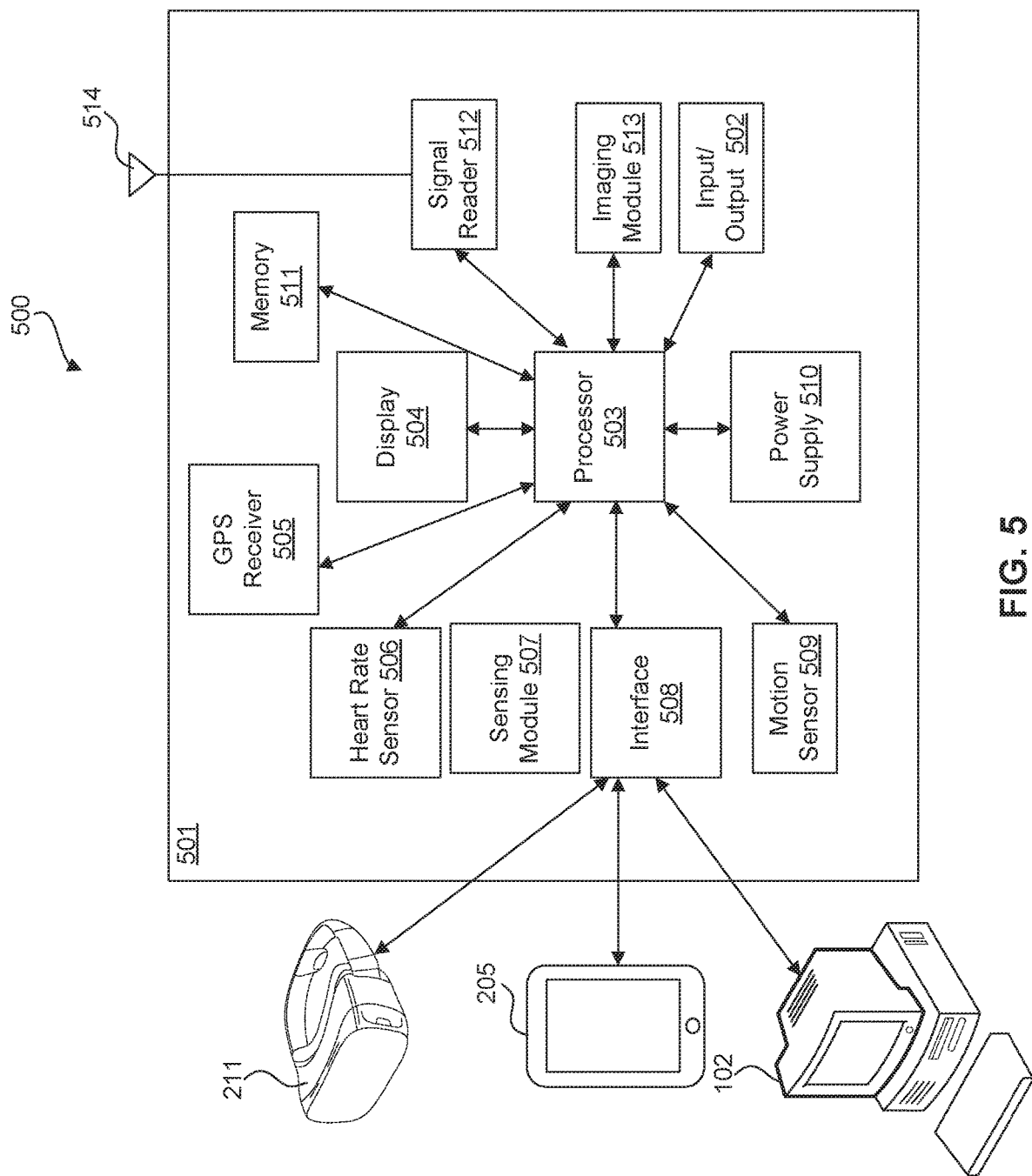
FIG. 5 illustrates a block diagram of a wearable device for guards of a controlled environment, according to embodiments of the present disclosure.

In some embodiments, multi-functional platform 101 further includes a wearable device that supplements the functions of portable device 301. FIG. 5 illustrates a block diagram 500 of a wearable device 501 containing certain functions to supplement certain functions of portable device 301. In some embodiments, wearable device 501 also includes AR functions. In an embodiment, wearable device 501 includes any suitable wearable devices being fixed onto the monitored personnel, such as a watch, a strap, and/or a band. Wearable device 501 is fixed at a position of the monitored personnel's body to more conveniently detect certain signals/data. For example, wearable device 501 is in the form of a watch or band, fixed on the monitored personnel's arm.

Similar to portable device 301, in some embodiments, wearable device 501 includes an input/output 502, a processor 503, a display 504, a GPS receiver 505, a sensing modules 507, an interface 508, a motion sensor 509, a power supply 510, a memory 511, a signal reader 512, an imaging module 513, and an antenna 514. In one embodiment, wearable device 501 communicates with portable device 301, control center 102, AR devices 211, and/or other suitable device (not shown) in communication system 100 through interface 508. The functions of these parts are similar or same as the corresponding parts in portable device 301 and are not repeated herein. In one embodiment, wearable device 501 sends received signals/data to portable device 301, AR devices 211, and/or control center 102 for processing and analysis. Accordingly, wearable device 501 receives commands/inquiries from portable device 301, AR devices 211, and/or control center 102 to execute functions.

In some embodiments, wearable device 501 further includes a heart rate sensor 506 and a motion sensor 509. Heart rate sensor 506 can be any suitable sensing device that monitors the heart rate or pulse of the monitored personnel. For example, heart rate sensor 506 can be a strap sensor or strapless sensor, including necessary accessories. Motion sensor 509 can be any suitable sensing device that detects the body motion of the monitored personnel. For example, motion sensor 509 can be a solid-state sensor or non-solid-state sensor. In an embodiment, wearable device 501 more accurately detects the heart rate change and body motion change of the monitored personnel. In some embodiments, wearable device 501 further includes suitable sensors (not shown) for detecting the respiration rate of the monitored personnel. Detected heart rate, body motion, and/or respiration rate are sent to portable device 301, AR devices 211, and/or control center 102 to be processed and analyzed.

In another example, monitored personnel has the option to use wearable device 501 to record images and videos, or stream videos. Compared to portable device 501, wearable device 501 is smaller, easier to carry and wear, and provides more convenience and shorter response time for certain actions. In various embodiments, monitored personnel has the option to use one or more of the portable device 301 and wearable device 501.

In some embodiments, multi-functional platform 101 further includes a positioning component/gadget (not shown) attached to or fixed onto the monitored personnel. The positioning component communicates with one or more of portable device 301, AR devices 211 and wearable device 501 so that the one or more of these devices can detect the presence of the positioning component when the positioning component is in the close proximity of the one or more of these devices. The positioning component is firmly fixed onto the monitored personnel, e.g., semi-permanently, to prevent removal by anyone other than an authorized personnel, e.g., the monitored personnel and/or a supervisor. Thus, the positioning component more precisely reflects the relative position between the monitored personnel and the one or more of portable device 301, AR devices 211 and wearable device 501, and ensures the monitored personnel in a close proximity, e.g., detectable range, of one or more of these devices. In an embodiment, the positioning component communicates with AR devices 211 for the relative positioning of the monitored personnel.

In some embodiments, the positioning component includes a wireless communication portion that transmits wireless positioning signals to one or more of portable device 301, AR devices 211 and wearable device 501, for these devices to determine the relative position between the monitored personnel and these devices. In some embodiments, the wireless communication portion includes passive and/or active RF tags for transmitting RF signals receivable by these devices. For example, the RF tags can be passive and respond to detection inquiries from one or more of these devices by sending RF signals at a certain frequency. In another example, the RF tags can be active and periodically send out RF signals for one or more of these devices to track the presence of the monitored personnel. In some embodiments, the RF tags include Bluetooth low energy (BLE) RF tags. In some embodiments, when one or more of these devices fail to detect the presence of the monitored personnel, an alert is sent to control center 102 to report the absence of the monitored personnel.

The positioning component can be attached to the monitored personnel in any suitable forms. In some embodiments, the positioning component can include any suitable device tethered to the monitored personnel. For example, the positioning component can include an ankle strap, a tethered ankle monitor, a wrist strap, a tethered wrist monitor, and/or other suitable devices tethered to the monitored personnel. In some embodiments, the positioning component can include an implant to the monitored personnel.

Figure 6A:
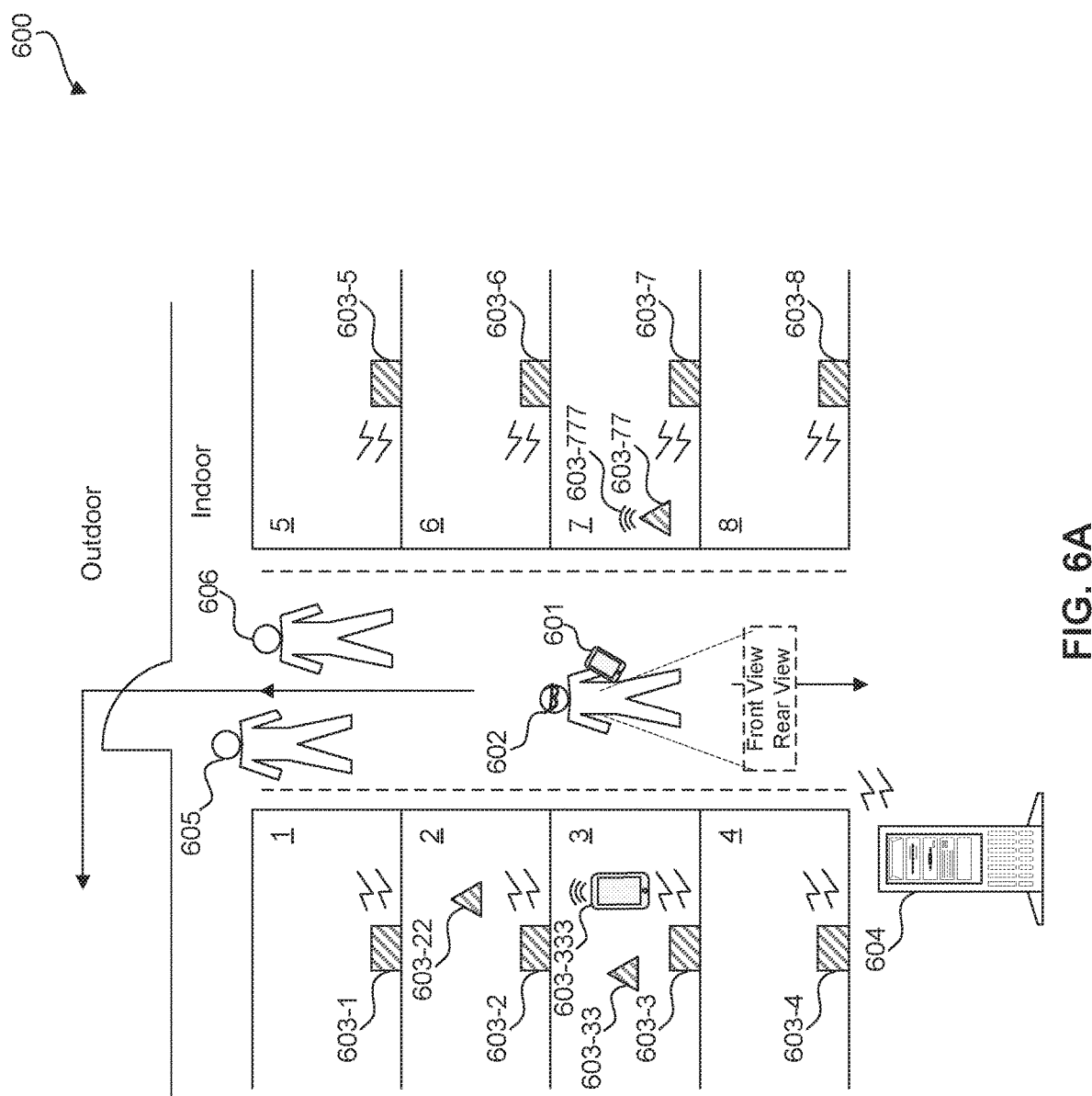
FIG. 6A illustrates a block diagram of an indoor map of a controlled environment, according to embodiments of the present disclosure.

FIG. 6A illustrates a portion of a simulated map 600 reflecting certain status of subjects/objects in the area corresponding to the portion of map 600. Map 600 is simulated based on the signals/data provided by portable device 301, AR devices 211, and/or wearable device 501, with stored map data. Activities reflected by map 600 indicate real-time status of each subject/object detected by multi-functional platform 101. In some embodiments, map 600 is displayed at control center 102. In some embodiments, map 600 is also displayed on portable device 301, wearable device 501, and/or AR devices 211 carried by the monitored personnel.

As shown in FIG. 6A, the map shows the controlled environment includes an indoor environment and an outdoor environment. A portable device, same as or similar to portable device 301, is represented by element 601. The indoor environment contains cells 1-8, each being installed a positioning signal transmitter 603-$n$ ($n$=1, 2, . . . , 8) in the cell. A positioning signal transmitter 603-$n$ represents one or more transmitters of same or different types of positioning methods, e.g., Bluetooth, WiFi, RF, and/or ultrasound, where they can be installed in same or different positions in a cell. The positions of the transmitters allow signals transmitted by the transmitters to be sufficiently strong in a detectable distance range of a detecting devices, e.g., portable device 301 and/or AR headset 602. As shown in map 600, one inmate is positioned in cell 2, wearing an ID tag 603-22, another inmate is positioned in cell 3, wearing an ID tag 603-33, and another inmate is positioned in cell 7, wearing an ID tag 603-77. Inmate in cell 3 possesses a multi-functional wireless device 603-333. Inmate in cell 7 possesses a contraband wireless device 603-777. The monitored personnel is walking along the aisle for, e.g., a walk and observe assignment. In an embodiment, map 600 shows a designed path, the double-headed arrow, for the monitored personnel to follow. The area between the dashed lines is a permitted area to the monitored personnel, e.g., the monitored personnel is free to move in the area but is not permitted to go beyond the dashed lines. Element 604 represents any electronic device that can communicate with portable device 601.

In an embodiment, the monitored guard further wears an AR headset. The AR headset, same as or similar to AR headset 400, is represented by element 602. In some embodiments, AR headset 602 allows the monitored guard to simultaneously see front, side, and/or rear surroundings with augmented reality element. In an embodiment, the monitored personnel selects AR headset 602 to display front and rear views.

In an embodiment, a monitored personnel carries portable device 601 and AR headset 602 in an assignment. When the monitored personnel is in the indoor environment, portable device 601 automatically switches to "indoor mode," and transmits detected signals/data to control center 102 (not shown in FIG. 6) in real-time. Positioning signal transmitters 603-$n$ ($n$=1-8) includes WiFi access points transmitting known WiFi signals and other related parameters, e.g., MAC addresses, of the access points. Inmates in cells 2, 3, and 7 each wears an RFID, containing identification information of the inmates. Portable device 601 receives the WiFi signals and other parameters transmitted by nearby access points, transmits received WiFi signals and parameters to control center 102, and calculates the real-time location of portable device 601 based on the received WiFi signals and parameters, and pre-stored reference signal strength data of the WiFi signals. As the monitored personnel is moving, portable device 601 continuously sends received WiFi signals and parameters to control center 102 and calculates the real-time location of portable device 601. Portable device 601 further calculates moving speed, path, and/or dwelling times based on the positioning data. Results of the calculation are displayed on portable device 601.

Meanwhile, control center 102 similarly calculates the location, moving speed, path, and/or dwelling times based on received data. If an abnormal status is detected, e.g., monitored personnel moves beyond the permitted area, e.g., deviates from the designed path, both portable device 601 and control center 102 generate an alert, prompting the monitored personnel to respond within a certain period of time, e.g., one minute. In an embodiment, AR headset 602 displays the map, the simulated positioning information calculated by portable device 601, and augmented reality alert of "deviation from path" or the like as an overlay of the front view for the monitored personnel to see. The monitored personnel has the option to respond through portable device 601 or AR headset 602, e.g., by inputting text or voice. If the monitored personnel fails to respond within this period of time, portable device 601 starts streaming video to control center 102 and AR headset 602 displays an alert of "starting streaming of video" as an overlay of the front view. In another example, if portable device 601 is detected to be staying at one location or certain locations for an unexpected long period of time, portable device 601, AR headset 602, and/or control center 102 generate an alert, prompting the monitored personnel to respond within a certain period of time. In an embodiment, when the monitored personnel is detected to have deviated from the designed path, portable device 601 automatically starts recording video and streaming the recorded video to control center 102. In some embodiments, when the monitored personnel is detected to have deviated from the designed path, AR headset 602 automatically starts streaming the front view and the rear view to control center 102. In another embodiment, control center 102 controls portable device 601 and a wearable device same as or similar to wearable device 501 to both start recording and streaming videos when the monitored personnel is detected to have deviated from the designed path.

In another embodiment, portable device 601 detects and counts the presence of inmates in the detectable distance range. Portable device 601 reads out identification information transmitted by the ID tags, e.g., RFID tags 603-22, 603-33, and 603-77, carried by the inmates, and sends the identification information to control center 102. Control center 102 compares the identification and location information with pre-stored inmate data and determines whether the presence information matches pre-stored inmate data. If a mismatch is found, e.g., inmate absent or inmate in the wrong cell, control center 102 send an alert to portable device 601, prompting the monitored personnel to check and confirm. If the monitored personnel fails to respond within a certain period of time or confirms absence, control center 102 sends an alert to other monitored personnel carrying portable devices 601 and/or other personnel. In an embodiment, ID tags 603-22, 603-33, and 603-77 also contain Bluetooth beacons. Portable device 601 detects the location and moving of inmates carrying the ID tags based on received Bluetooth signals. In an example, when portable device 601 detects an inmate is moving towards the monitored personnel at an unusually high speed, portable device 601 alerts the monitored personnel. The monitored personnel has the option to respond to such situation by notifying control center 102 and/or other personnel. In various embodiments, positioning information of inmates are also sent to control center 102 through communication device for further processing and calculation.

In an embodiment, ID tags, e.g., 603-22, 603-33, and 603-77, contain the criminal and/or violation history of corresponding inmates, which is also stored in control center 102. When an inmate having a history of aggression or malicious behavior, e.g., being malicious towards personnel in the controlled environment, is detected to be in the proximity of the monitored personnel, portable device 601 or control center 102 sends an alert to the monitored personnel, notifying him/her the presence of such inmate.

In an embodiment, portable device 601 detects an unknown wireless signal 603-777 within the detectable distance range, e.g., transmitted from a contraband wireless device in cell 7. The unknown signal 603-777, corresponding location, and/or corresponding inmate information are thus detected by portable device 601 and control center 102. Control center 102 further starts investigation of the contraband wireless device.

In an embodiment, when the monitored personnel undergoes a sudden body motion or sudden heart rate increase/decrease, portable device 601 sends an alert to control center 102 and starts streaming video. In various embodiments, the monitored personnel has the option to initiate communication, e.g., texting or video chatting, sending images and voice messages, and/or record images and videos during an assignment. The monitored personnel also has the option to start streaming videos at a desired time.

In an embodiment, portable device 601 includes voice control functions. A voice sample of the monitored personnel is stored and registered in communication system 100 for authenticate the monitored personnel's identity. The monitored personnel has the option to activate certain functions of portable device 601 using his/her voice and/or certain phrases. In some embodiments, a portable device 601 can only be voice controlled by the monitored personnel assigned to portable device 601.

In an embodiment, wireless device 604 communicates with portable device 601 by sending related information, e.g., type, manufacturer, usage, operation status, etc. In some embodiments, wireless device 604 is controlled by control center 102 and/or portable device 601. The monitored personnel and/or control center 102 have the option to remotely control certain functions of wireless device 604, e.g., recording of videos, sending location of wireless device 604 to portable device 601/control center 102, and so on. The availability of functions are dependent on the type of wireless device 604 and should not be limited by the embodiments of the present disclosure.

In an embodiment, when the monitored personnel enters the outdoor environment, portable device 601 directly switches to the "outdoor mode," and starts sending GPS coordinates to control center 102 in real-time. Meanwhile, portable device 601 calculates positioning information using GPS coordinates and updates the positioning information on the map.

In various embodiments, the monitored personnel also wears a wearable device (not shown in FIG. 6A) same as or similar to wearable device 501 illustrated in FIG. 5. The operation of the wearable device is similar to portable device 601. In some embodiments, portable device 601 receives heart rate data and body motion data of the monitored personnel from wearable device and sends the data to control center 102. For example, when guard undergoes a sudden acceleration or movement, e.g., falling on the floor, the wearable device and/or portable device 601 detect such abnormal activity and send an alert to control center 102. In some embodiments, the recording/streaming functions of portable device 601 and the wearable device can be used separately. That is, the monitored personnel has the option to use portable device 601 and the wearable device at same time for recording/streaming different scenes, or use portable device 601 and wearable device at different times. Control center 102 has the authority to control the operation of portable device 601 and wearable device.

In some embodiments, the wearable device includes only certain functions of portable device 601 to supplement portable device 601. Accordingly, the wearable device has reduced volume and size, and is easier to wear. For example, the wearable device may only have the heart rate and body motion monitoring function and data transmission function. Detected heart rate and body motion data is sent to portable device 601 and/or control center 102 for processing and analysis. In some embodiments, portable device 601 and the wearable device have complementary functions.

In an embodiment, AR headset 602 is configured to detect nearby inmates, similar to portable device 601, and perform facial recognition of inmates captured in the camera. AR headset 602 displays augmented reality element of the recognized inmates upon the detection of the inmates. In an embodiment, AR headset 602 displays information of inmates as augmented reality data when the monitored personnel passes the inmates' assigned locations. In some embodiments, at least some functions performed by AR headset 602 overlap with the functions performed by portable device 601.

Depending on different applications and design preferences, communication system 100, including control center 102, portable device 601, AR headset 602, and wearable device are configured to respond to different situations differently. In various embodiments, portable device 601, AR headset 602, and the wearable device are configured to have complementary functions in response to various situations. The combination of situations and responses should be subjected to designs and preferences of different applications and should not be limited by the embodiments of the present disclosure.

Figure 6B:
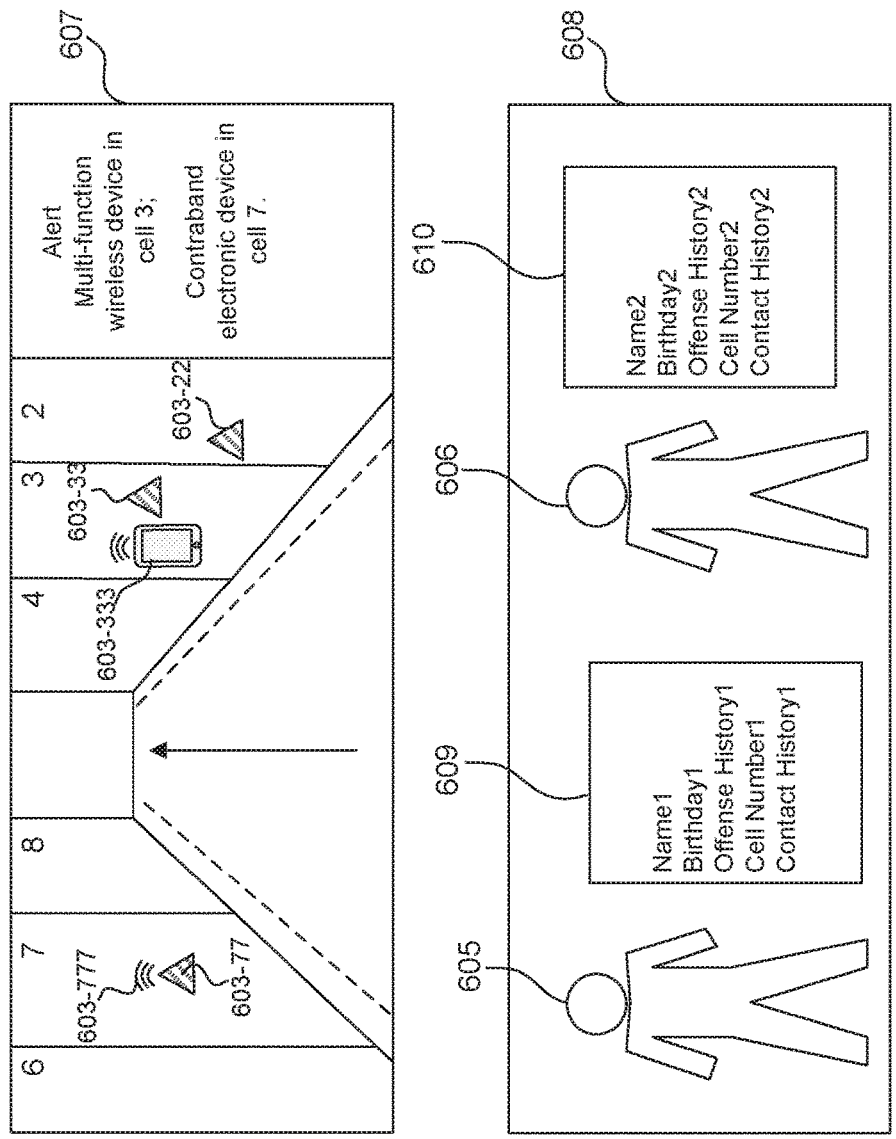
FIG. 6B illustrates views of a user of an AR device for guards of a controlled environment, according to embodiments of the present disclosure.
Figure 7:
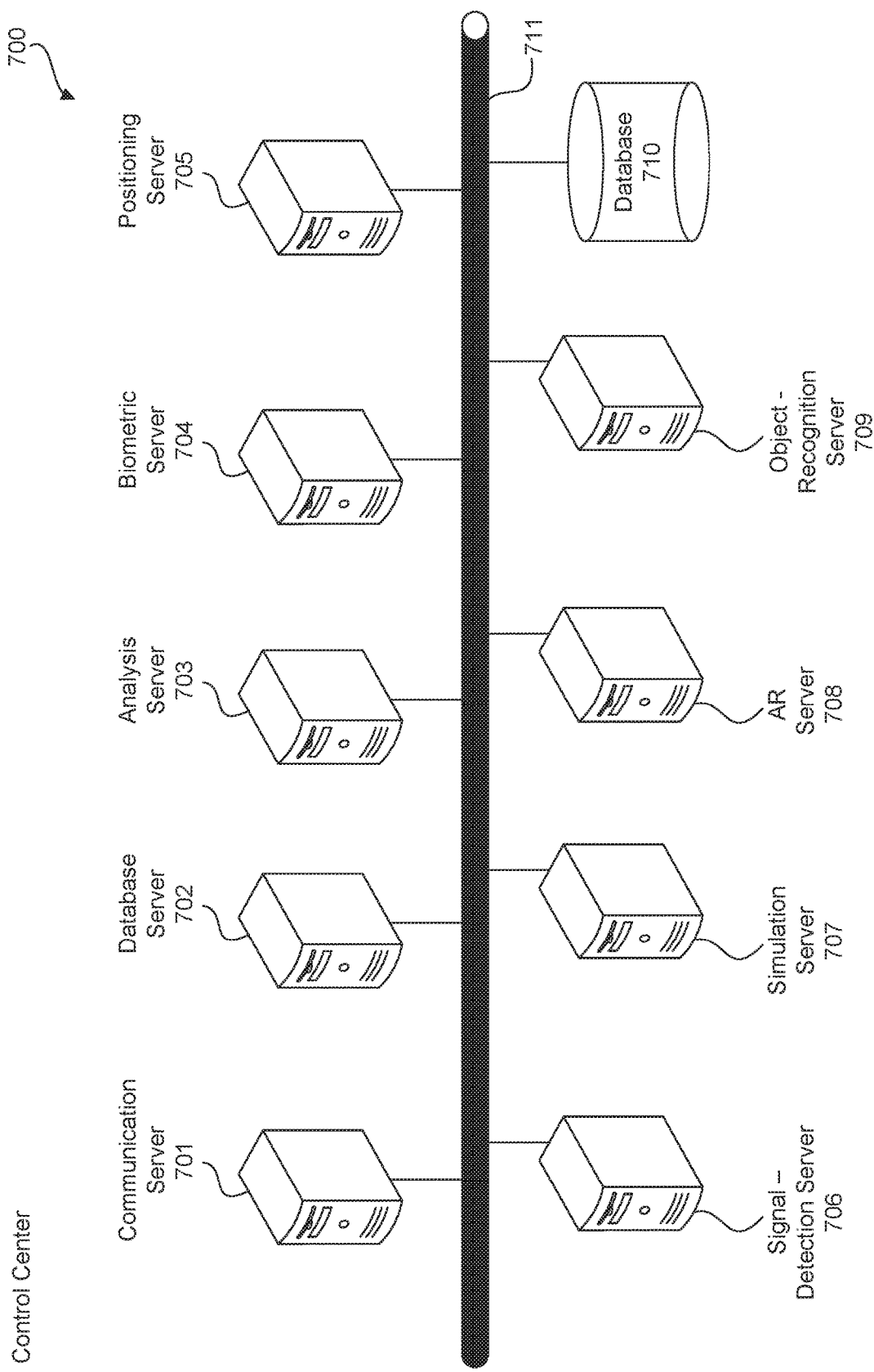
FIG. 7 illustrates a block diagram of a control center of a controlled environment, according to embodiments of the present disclosure.

FIG. 6B illustrates exemplary front and rear views displayed by AR headset 400. In an example, AR headset 400 arranges the front view 607 on top of rear view 608 for ease of viewing by the monitored personnel. In an embodiment, in the front view 607, the monitored personnel sees the inmate cells 2-4 and 6-8 through AR headset 400. AR headset 400 displays augmented reality element, e.g., ID tags 603-22, 603-33, and 603-77 in cells 2, 3, and 7, respectively, to inform the monitored personnel the presence of corresponding inmates. AR headset 400 also displays augmented reality element showing existence of contraband electronic device 603-777 in cell 7 and multi-functional wireless device 603-333 in cell 3. AR headset 400 further displays augmented reality element of the boundary of the permitted area (dashed lines) and permitted direction of moving. In some embodiments, AR headset 400 further displays augmented reality element such as text messages. For example, as shown in front view 607, AR headset 400 displays augmented reality text of an alert, notifying the monitored personnel a multi-functional wireless device 603-333 in cell 3 and a contraband electronic device 603-777 in cell 7. Upon the detection of multi-functional wireless device 603-333, control center 102 starts to investigate the identity of the inmate associated with the device and determines whether multi-functional wireless device 603-333 is within a permitted area.

In an embodiment, in the rear view 608, the monitored personnel sees the two inmates 605 and 606 located behind the monitored personnel. Through facial recognition, AR headset 400 detects the identities of inmates 605 and 606, and displays augmented reality elements, e.g., in the form of text messages 609 and 610 that include name, birthday, offense history, cell number, and contact history of each inmate by the physical image/video of each inmate. In an embodiment, front view 607 and rear view 608 are streamed to control center 102 in real-time for control center 102 to monitor the controlled environment. In an embodiment, front view 607 and rear view 608 are accessed by third party 115 through control center 102 in real-time.

Control Center

Control center 700 is configured to receive data, process data, and/or make decisions based on the processing results. Control center 700 is similar to or same as control center 102 in previous description of the present disclosure. In an embodiment, control center 700 includes communication server 701, database server 702, analysis server 703, biometric server 704, positioning server 705, simulation server 707, AR/VR server 708, object-recognition server 709, and database 710, all of which are connected to one another via a network bus 711. In some embodiments, the functions of communication server 701, database server 702, analysis server 703, biometric server 704, positioning server 705, signal-detection server 706, simulation server 707, AR/VR server 708, object-recognition server 709, and database 710 are implemented within a single device. Each of servers 701-709 can be constructed as individual physical hardware devices, or as virtual servers. The number of physical hardware machines can be scaled to match the number of simultaneous user connections desired to be supported by communication system 100. For control center 700 includes any suitable database for storing data received from the servers and other parties. Additional database can also be included in database 710 to facilitate proper functions of control center 700.

In an embodiment, communication server 701 consists of one or more servers, and is configured to receive and transmit information to/from one or more authorized facilities such as control center 700 and multi-functional platform 101. Communication server 701 receives input from multi-functional platform 101 and other parties and send the processed input to analysis server 703. That is, communication server 701 forwards inquiries to respective analysis server 703 through network bus 711 for analysis of and generation of a response to the inquiry. Communication server 701 further receives the response from analysis server 703 and forwards the response to the appropriate party.

In an embodiment, communication server 701 is further configured to perform authentication of inquiries to determine whether the submitting facility or party is authorized to access the information located in database 710. If the facility or party is authenticated, communication server 701 continues with the inquiry process by, for example, forwarding the inquiry to analysis server 703. Moreover, communication server 701 is further configured to encrypt and decrypt all communications transmitted and received by communication system 100 for security purposes. In an embodiment, a facility/party is authorized only to write data into database 710, only to read data from database 710, or authorized to both read data from and write data into database 710. In another embodiment, communication server 701 is configured to provide different levels of access to database 710 based on the type of facility and the type of party. Moreover, access to data within database 710 may vary based on the type of data to which access is sought. For example, one facility can be authorized only to access certain types of data into database 710, such as the data that the facility has uploaded. Another facility can be authorized to access its data as well as data provide by other facilities. The access by facilities can be limited to read only, write only, or read/write based on the type of facility, the type of data, or any other parameters related to the unified database system.

In an embodiment, database server 702 consists of one or more servers, and is configured to store and organize data in database 710. Database server 702 can be configured to run a database management system, such as MYSQL™. Database server 702 interfaces with database 710 to store information provided to communication system 100 multi-functional platform 101 and other parties. Database server 702 can further be configured to provide information from database 710 to connected facilities who submit inquiries. Moreover, database server 702 is configured to encrypt the information prior to storage to ensure security of the information.

In an embodiment, analysis server 703 consists of one or more servers, and functions as the primary logic processing center in control center 700. Analysis server 703 processes information input from other servers, multi-functional platforms 101 of different monitored personnel, and information input from monitoring personnel at control center 700. Analysis server 703 makes decisions based on the information input, and responds correspondingly. As part of its functionality to conduct analysis of inquiries based on data in database 710, analysis server 703 can further be configured to manage and facilitate communication between communication server 701, database server 702, biometric server 704, positioning sever 705, simulation server 707, AR/VR server 708, object-recognition server 709, and database 710.

In various embodiments, analysis server 703 also generates logs and reports reflecting activities of monitored personnel. The logs and reports may include analytical reports and visual representations of a monitored personnel's activities in a certain period of time. In various embodiments, because analysis server 703 is connected to database 710 and other servers, analysis server 703 analyzes patterns based on data received from other servers and retrieved from database 710 to determine whether a detected activity or status is abnormal and responds accordingly.

In an embodiment, biometric server 704 consists of one or more servers, and is configured to process and/or store biometric data of inmates and other personnel in the controlled environment. Biometric data can include any information regarding an inmate's or personnel's appearance, physical characteristics, or other identifying traits that may be unique to the person such as voice data, facial recognition data (2D or 3D), handwriting samples, and/or fingerprint data. Biometric server 704 is configured to assist in analyzing biometric input sent from multi-functional platform 101. For example, biometric server 704 can compare received biometric input against stored biometric data.

In an embodiment, positioning server 705 consists of one or more servers, and is configured to determine the location of a monitored personnel based on received data/signals from multi-functional platform 101 and data stored in database 710. Received data/signals include signals transmitted by positioning signal transmitters and GPS coordinates. Positioning server 705 includes algorithm(s) an models for calculating the indoor location and outdoor location of a monitored personnel, based on received data/signals and reference data stored in database 710. Positioning server 705 also includes algorithm(s) for calculating the surroundings, e.g., presence of inmates and certain electronic devices, of a monitored personnel based on received data/signals and reference data stored in database 710. Results of calculation are further sent to analysis server 702 for further processing or decision making, or sent to simulation server 707 to be visualized.

In an embodiment, signal-detection server 706 consists of one or more servers, and is configured to detect wireless signals within a scanned wavelength range. Signal-detection server 706 is configured to scan one or more wavelength ranges to capture wireless signals, e.g., WiFi signals, RF signals, Bluetooth signals, and/or ultrasound signals. Information of detected signals is transmitted to analysis server 703 to separate the unknown or suspicious wireless signals from the known and allowed wireless signals. Known or allowed wireless signals are further analyzed to determine their usage, e.g., for positioning or identification, etc. Unknown wireless signals are further analyzed to determine the properties and possible sources.

In an embodiment, simulation server 707 consists of one or more servers, and is configured to simulate real-time activities of a monitored personnel based on data stored in database 113 and signals/data sent from other servers. Simulation server 707 extracts coordinates information from database 113 to generate a map of controlled environment, and simulates/updates the path, moving speed, and dwelling times of the monitored personnel in the map so that the map reflects the real-time status of the monitored personnel. Simulation server 707 also simulates other detectable objects/subjects in real-time in the map based on data/signals received from other servers. For example, simulation server 707 also simulates the presence and status of inmates wearing/carrying certain signal-transmitting tags, e.g., radio frequency (RF) ID tags, and any devices transmitting a suitable detectable signal. The detectable objects/subjects are also displayed in the map.

In an embodiment, AR/VR server 708 consists of one or more servers, and is configured to generate augmented reality element and/or virtual reality element upon commands and/or detection of certain objects using data stored in database 113 and/or detected data from other servers. AR/VR server 708 includes algorithm and module for generating various text, graphics, images, and videos to be displayed to the monitored personnel and/or monitoring personnel. AR/VR server 708 extracts data from database 113 based on the detected objects or commands from analysis server 703 to generate augmented reality element that provides information in addition to the physical objects.

In an embodiment, object-recognition server 709 consists of one or more servers, and is configured to perform facial recognition and/or pattern recognition of the objects in the surroundings captured in the images/videos. Object-recognition server 709 includes algorithms and modules for comparing the objects detected in the images/videos using pre-stored facial feature samples and/or object pattern samples in database 710. Object-recognition server 709 further sends the results of pattern comparison to analysis server 703 for further analysis.

In an embodiment, database 710 provides access to all communication system 100 used for various calculations. In general, database 710 stores any data stored by communication server 701, database server 702, analysis server 703, biometric server 704, positioning server 705, simulation server 707, AR/VR server 708, and object-recognition server 709. Because the data stored on database 710 may consume a significant amounts of storage space, database 710 may include a Network Attached Storage (NAS) device, which is configured as a mass storage device, or configured as a storage area network (SAN) comprising multiple storage devices. In order to reduce the required size, database 710 preferably includes a backup routine to transfer data to permanent storage devices, such as archival permanent storage or optical disks, after a predetermined time has elapsed since the initial recording of that data. Database 710 is connected to communication server 701, database server 702, analysis server 703, biometric server 704, positioning server 705, simulation server 707, AR/VR server 708, and object-recognition server 709 by way of the network bus 711.

System Operations

Operations of monitoring activities of a monitored author using communication system 100 will be described with respect to FIGS. 8, 9, and 10. Although the physical devices and components that form the system have largely already been described, additional details regarding their operations will be described below with respect to FIGS. 1-7. While FIGS. 8, 9, and 10 contain methods of operation of communication system 100 for monitored personnel of a controlled environment, the operations are not limited to the order described below, and various operations can be performed in a different order. Further, two or more operations of each method can be performed simultaneously with each other.

Figure 8:
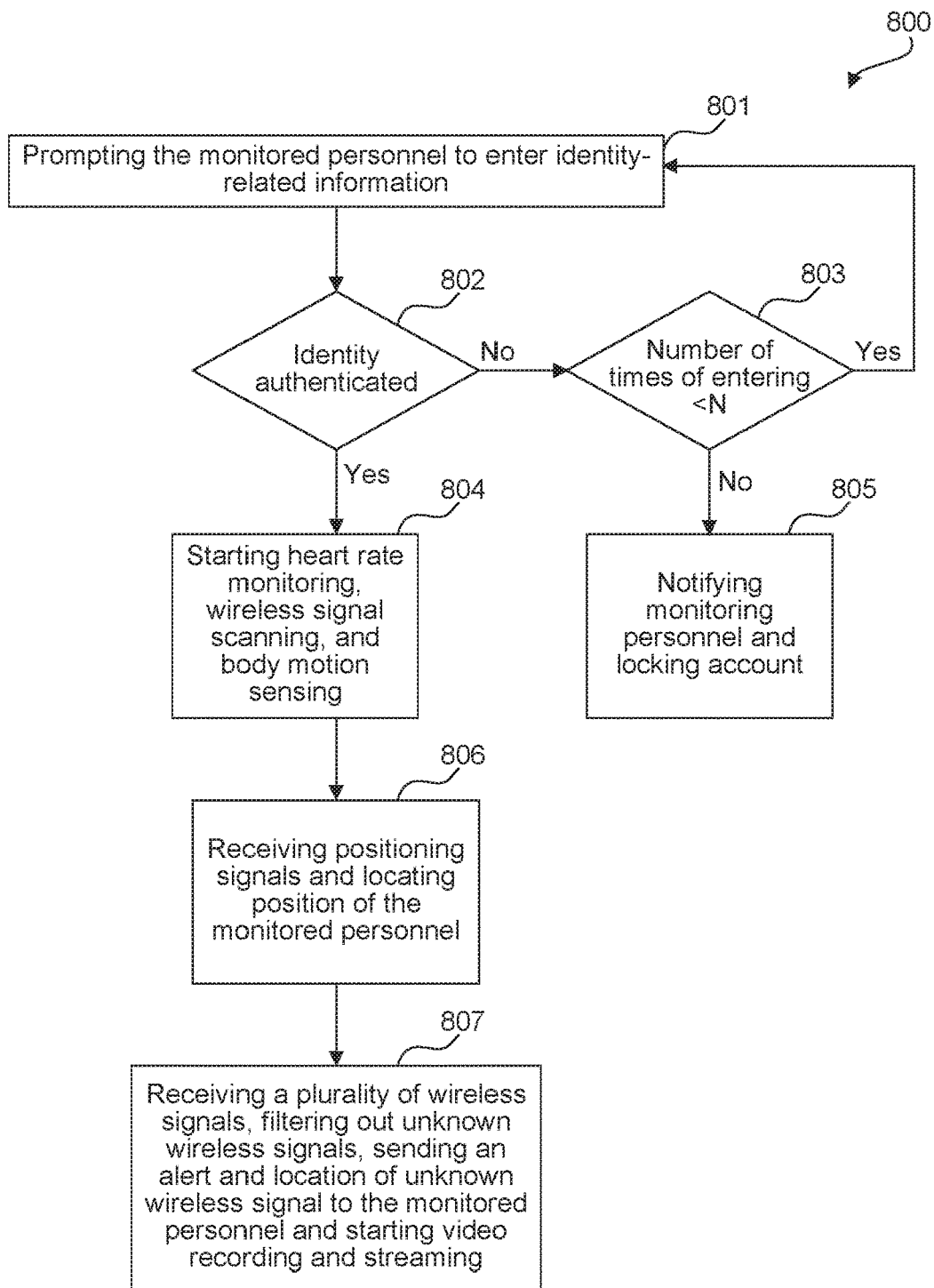
FIG. 8 illustrates a flowchart diagram of methods of tracking of guards and detecting a suspicious wireless signal, according to embodiments of the present disclosure.

FIG. 8 illustrates a flowchart diagram of a method 800 of tracking of the monitored personnel and detecting an unknown suspicious wireless signal, according to embodiments of the present disclosure. In step 801, control center prompts the monitored personnel, carrying the multi-functional platform, to enter identity-related information. In step 802, control center determines whether the identity of the monitored personnel is authenticated. If the identity of the monitored personnel fails to be authenticated, process proceeds to step 803; if the identity of the monitored personnel is authenticated, process proceeds to step 804. In step 803, control center determines whether the number of times of entering the identity-related information is less than N, N being a positive integer, process returns step 801. If the number of times of entering the identity-related information exceeds N, process proceeds to step 805. In step 805, control center notifies monitoring personnel about failed attempts of identity authentication and locks the personnel's account. In step 804, control center starts heart rate monitoring, wireless signal scanning, and body motion sensing from the beginning of an assignment. In step 806, control center receives positioning signals and locates the position of the monitored personnel. In step 807, control center receives a plurality of wireless signals, filters out unknown wireless signals, sends an alert and locations of unknown wireless signals to the monitored personnel, and starts video recording and streaming videos from multi-functional platform.

Figure 9:
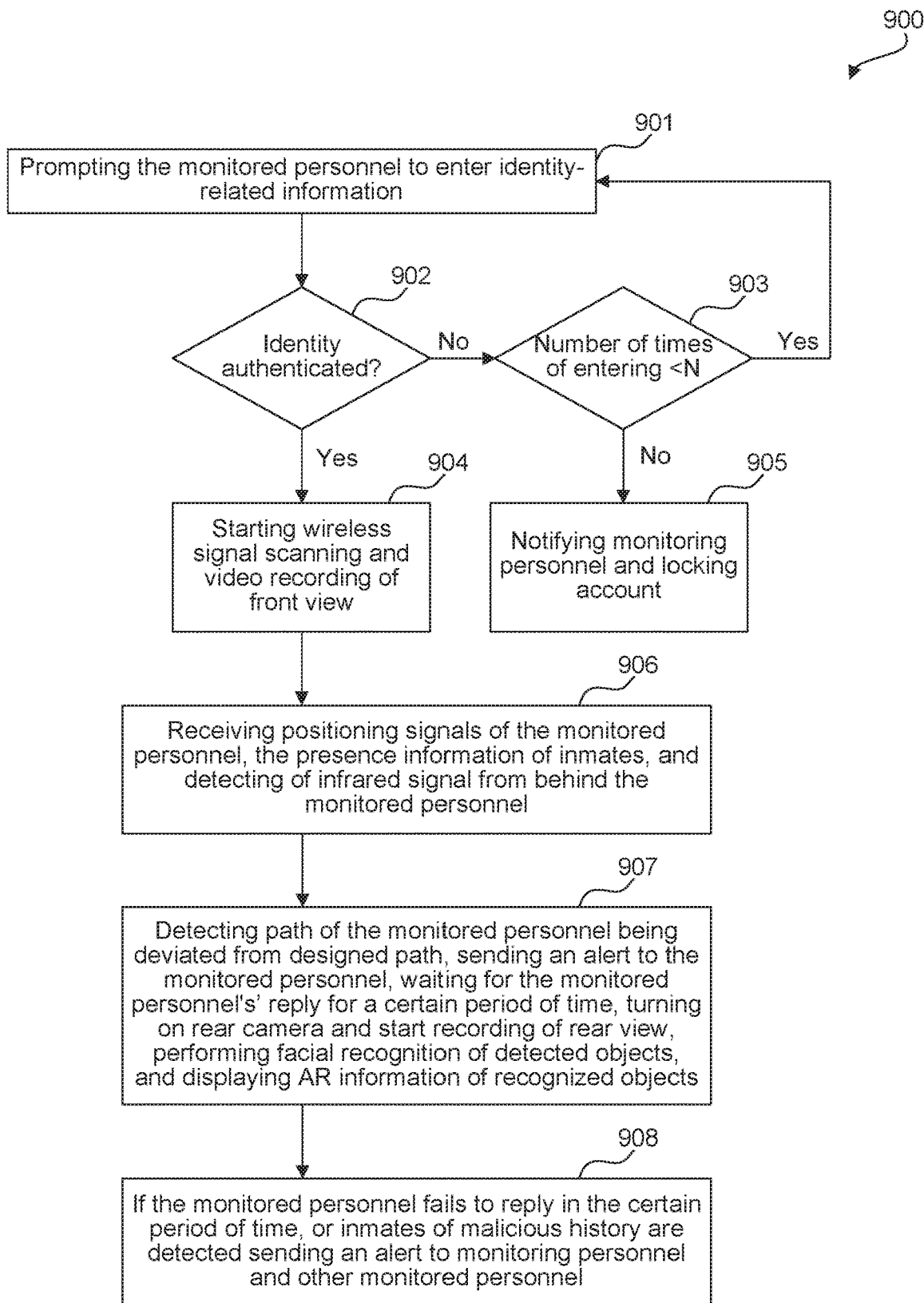
FIG. 9 illustrates a flowchart diagram of methods of tracking of guards and detecting objects behind the guard, according to embodiments of the present disclosure.

FIG. 9 illustrates a flowchart diagram of a method of tracking of the monitored personnel and detecting a deviation of path of the monitored personnel, according to embodiments of the present disclosure. Steps 901-903 and 905 are similar to or same as steps 801-803 and 805, respectively. In step 904, control center starts wireless signal scanning and video recording of the front view of the monitored personnel. In step 906, control center receives positioning signals of the monitored personnel and presence information of inmates from the detected wireless signals. Control center also detects infrared signal from behind the monitored personnel. In step 907, control center detects path of the monitored personnel being deviated from designed path, sends an alert to the monitored personnel, and waits for the monitored personnel's reply for a certain period of time. Control center also turns on rear camera and starts recording the rear view of the monitored personnel, and performs facial recognition of the detected objects. Control center further displays corresponding AR information of the recognized objects. In step 908, if the monitored personnel fails to reply in the certain period of time or inmates of malicious history are detected, control center sends an alert to monitoring personnel and other monitored personnel.

Figure 10:
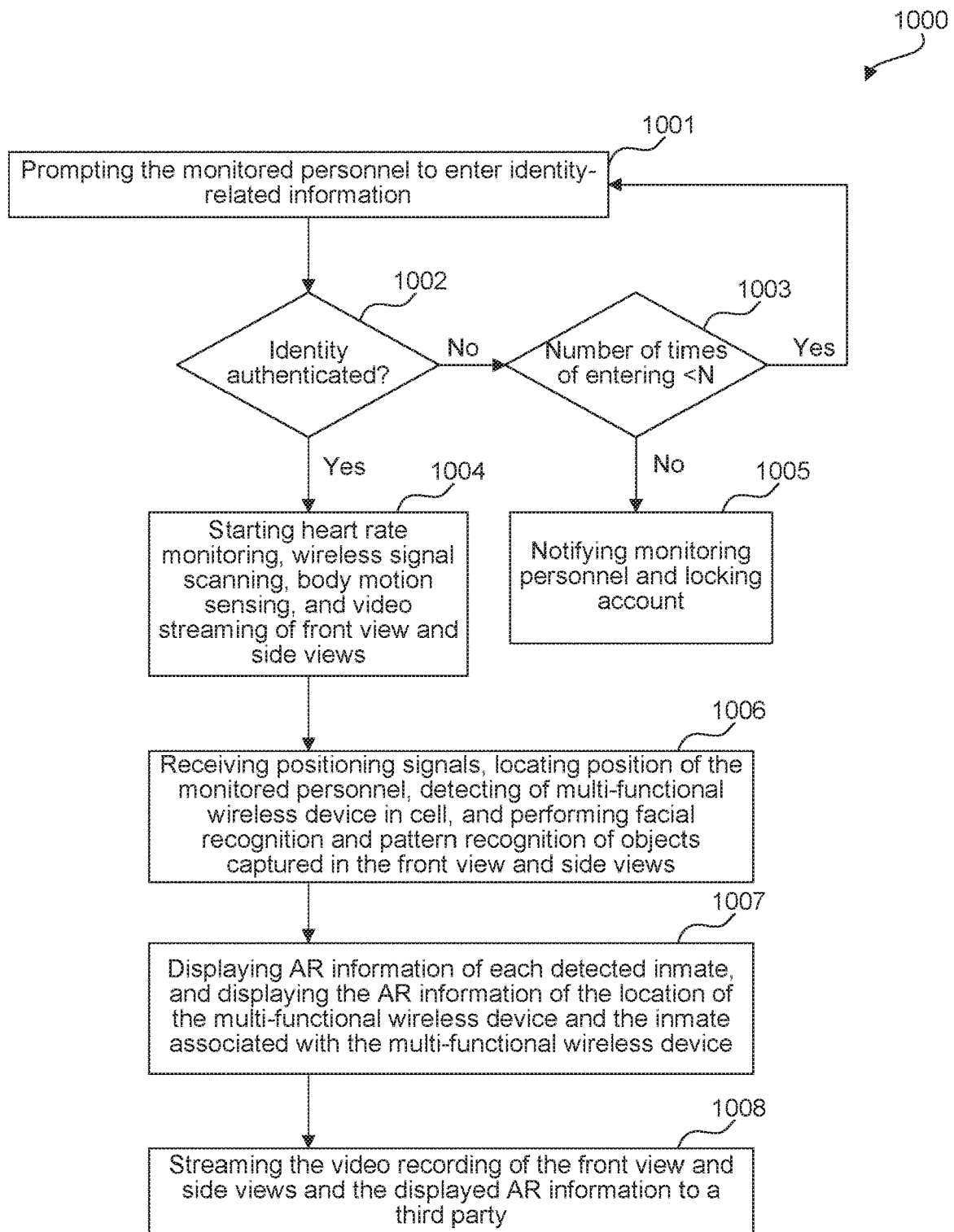
FIG. 10 illustrates a flowchart diagram of methods of tracking of guards and detecting multi-functional wireless devices used by inmates, according to embodiments of the present disclosure.

FIG. 10 illustrates a flowchart diagram of a method of tracking of the monitored personnel and detecting sudden changes in heart rate and body motion, according to embodiments of the present disclosure. Steps 1001-1003 and 1005 are similar to or same as steps 1001-1003 and 1005, respectively. In step 1004, control center starts heart rate monitoring, body motion sensing, wireless signal scanning, and video streaming of the front view and side views of the monitored personnel. In step 1006, control center receives positioning signals and locates position of the monitored personnel. Control center also detects presence of multi-functional wireless device in a forbidden cell nearby. Control center further performs facial recognition and pattern recognition of objects captured in the front view and side views of the monitored personnel. In step 1007, control center displays corresponding AR information of each detected inmate, displays corresponding AR information of the location of the multi-functional wireless device and the inmate associated with the multi-functional wireless device. In step 1008, control center streams the video recording of the front view and the side views, and the displayed AR information to a third party.

Exemplary Computer Implementation

It will be apparent to persons skilled in the relevant art(s) that various elements and features of the present disclosure, as described herein, can be implemented in hardware using analog and/or digital circuits, in software, through the execution of computer instructions by one or more general purpose or special-purpose processors, or as a combination of hardware and software.

Figure 11:
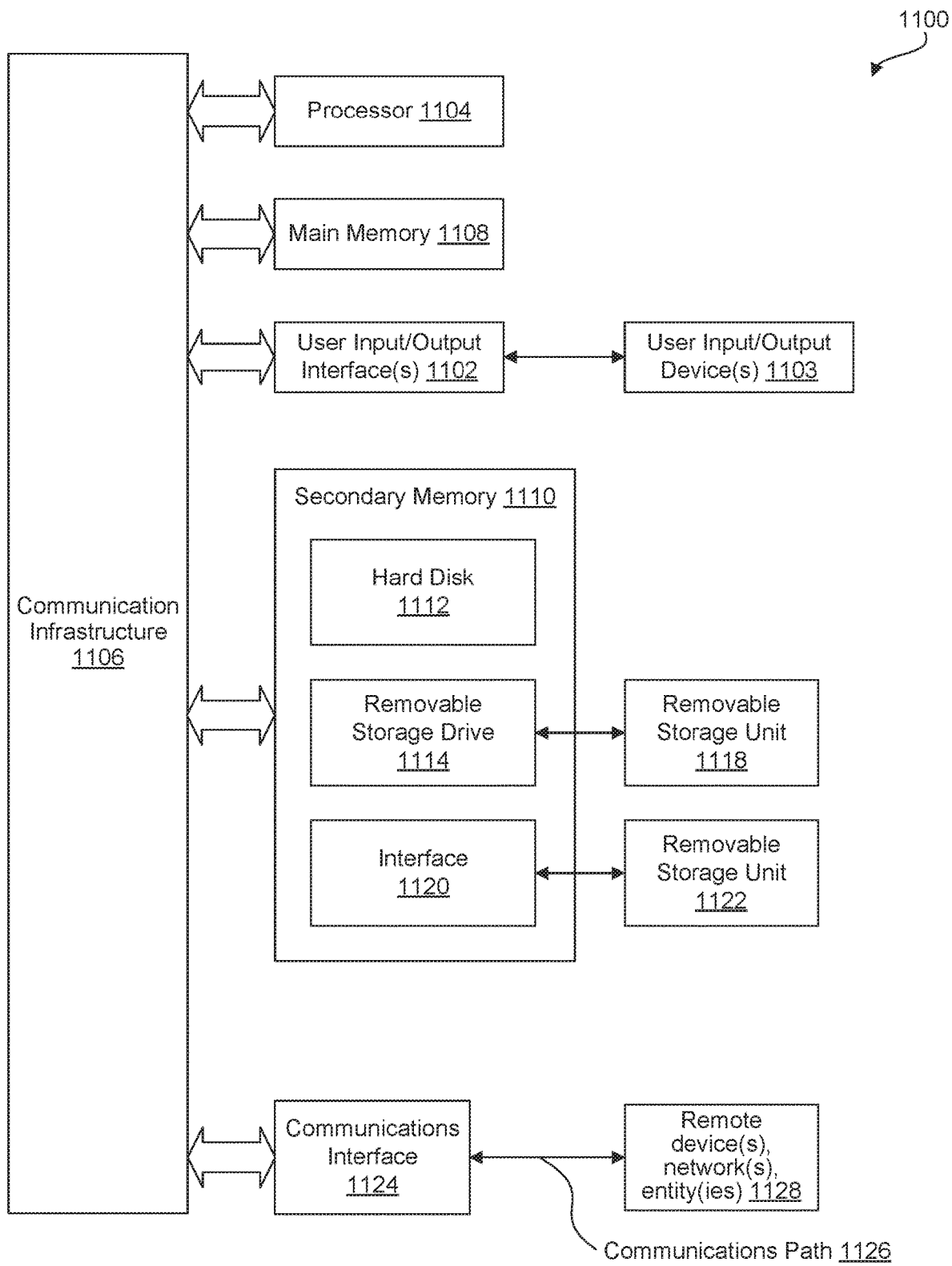
FIG. 11 illustrates a computer system, according to exemplary embodiments of the present disclosure.

The following description of a general purpose computer system is provided for the sake of completeness. Embodiments of the present disclosure can be implemented in hardware, or as a combination of software and hardware. Consequently, embodiments of the disclosure may be implemented in the environment of a computer system or other processing system. For example, the control center of FIG. 1 and the methods of FIGS. 8-10 can be implemented in the environment of one or more computer systems or other processing systems. An example of such a computer system 1100 is shown in FIG. 11. One or more of the modules depicted in the previous figures can be at least partially implemented on one or more distinct computer systems 1100.

Computer system 1100 includes one or more processors, such as processor 1104. Processor 1104 can be a special purpose or a general purpose digital signal processor. Processor 1104 is connected to a communication infrastructure 1106 (for example, a bus or network). Various software implementations are described in terms of this exemplary computer system. After reading this description, it will become apparent to a person skilled in the relevant art(s) how to implement the disclosure using other computer systems and/or computer architectures.

Computer system 1100 also includes a main memory 1108, preferably random access memory (RAM), and may also include a secondary memory 1110. Secondary memory 1110 may include, for example, a hard disk drive 1112 and/or a removable storage drive 1114, representing a floppy disk drive, a magnetic tape drive, an optical disk drive, or the like. Removable storage drive 1114 reads from and/or writes to a removable storage unit 1118 in a well-known manner. Removable storage unit 1118 represents a floppy disk, magnetic tape, optical disk, or the like, which is read by and written to by removable storage drive 1114. As will be appreciated by persons skilled in the relevant art(s), removable storage unit 1122 includes a computer usable storage medium having stored therein computer software and/or data.

In alternative implementations, secondary memory 1110 can include other similar means for allowing computer programs or other instructions to be loaded into computer system 1100. Such means may include, for example, a removable storage unit 1122 and an interface 1120. Examples of such means may include a program cartridge and cartridge interface (such as that found in video game devices), a removable memory chip (such as an EPROM, or PROM) and associated socket, a thumb drive and USB port, and other removable storage units 1122 and interfaces 1120 which allow software and data to be transferred from removable storage unit 1122 to computer system 1100.

Computer system 1100 also includes user input/out interface(s) 1102 which provide an interface to user input/output device(s) 1103. Such user input/output device(s) 1103 may be any device that provides a user access to input and output of computer system 1100. Examples of user input/output device(s) 1103 may include a keyboard, a computer monitor, a mouse, a camera, and a microphone.

Computer system 1100 also includes a communications interface 1124. Communications interface 1124 allows software and data to be transferred between computer system 1100 and external devices 1128 which can include remote device(s), other network(s), and other entities. Examples of communications interface 1124 can include a modem, a network interface (such as an Ethernet card), a communications port, a PCMCIA slot and card, etc. Software and data transferred via communications interface 1124 are in the form of signals which can be electronic, electromagnetic, optical, or other signals capable of being received by communications interface 1124. These signals are provided to communications interface 1124 via a communications path 1126. Communications path 1126 carries signals and may be implemented using wire or cable, fiber optics, a phone line, a cellular phone link, an RF link and other communications channels.

As used herein, the terms "computer program medium" and "computer readable medium" are used to generally refer to tangible storage media such as removable storage units 1118 and 1122 or a hard disk installed in hard disk drive 1112. These computer program products are means for providing software to computer system 1100.

Computer programs (also called computer control logic) are stored in main memory 1108 and/or secondary memory 1110. Computer programs can also be received via communications interface 1124. Such computer programs, when executed, enable the computer system 1100 to implement the present disclosure as discussed herein. In particular, the computer programs, when executed, enable processor 1104 to implement the processes of the present disclosure, such as any of the methods described herein. Accordingly, such computer programs represent controllers of the computer system 1100. Where the disclosure is implemented using software, the software may be stored in a computer program product and loaded into computer system 1100 using removable storage drive 1114, interface 1120, or communications interface 1124.

In another embodiment, features of the disclosure are implemented primarily in hardware using, for example, hardware components such as application-specific integrated circuits (ASICs) and gate arrays. Implementation of a hardware state machine so as to perform the functions described herein will also be apparent to persons skilled in the relevant art(s).

CONCLUSION

It is to be appreciated that the Detailed Description section, and not the Abstract section, is intended to be used to interpret the claims. The Abstract section may set forth one or more, but not all exemplary embodiments, and thus, is not intended to limit the disclosure and the appended claims in any way.

The disclosure has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the disclosure. Thus, the disclosure should not be limited by any of the above-described exemplary embodiments, but should be defined only in accordance with the following claims and their equivalents.

What is claimed is:

1. A personnel monitoring system, comprising:
a database that stores a plurality of parameters associated with at least one of a worker or a task;
a transceiver configured to exchange information with a field monitoring device; and
one or more processors configured to:
receive monitored data from the field monitoring device via the transceiver;
compare the monitored data to the plurality of parameters;
detect an abnormal status associated with the task based on the comparing; and
transmit at least one of a device control signal or a notification message to the field monitoring device via the transceiver in response to the detecting.

2. The personnel monitoring system of claim 1, wherein the plurality of parameters include at least one of task completion time, designated travel path, dwelling time at a task location, and heart rate range.

3. The personnel monitoring system of claim 1, wherein the monitored data includes at least one of a location of the field monitoring device and biometric data of the worker.

4. The personnel monitoring system of claim 1, wherein the notification message informs the worker of the abnormal status and includes an instruction for correcting the abnormal status.

5. The personnel monitoring system of claim 1, wherein the control signal causes at least one component of the field monitoring device to be activated and capture data.

6. The personnel monitoring system of claim 1, wherein each of the plurality of parameters include a range, and
wherein the comparing includes determining whether the received monitored data is within the range.

7. The personnel monitoring system of claim 6, wherein the detecting of the abnormal status includes determining that the received monitored data is outside of the range.

8. The personnel monitoring system of claim 4, wherein the instruction includes a travel direction.

9. The personnel monitoring system of claim 1, wherein the received monitored data includes captured images of an environment at a location of the field monitoring device.

10. The personnel monitoring system of claim 1, wherein the received monitored data includes captured images, and
wherein the detecting of the abnormal status includes:
comparing the received captured images to stored images; and
recognizing environmental objects based on the comparing.

11. A method for monitoring personnel in a controlled environment facility, comprising:
storing a plurality of parameters associated with at least one of a worker or a task;
receiving monitored data from a field monitoring device;
comparing the monitored data to the plurality of parameters;
detecting an abnormal status associated with the task based on the comparing; and
transmitting at least one of a device control signal or a notification message to the field monitoring device in response to the detecting.

12. The method of claim 11, wherein the plurality of parameters include at least one of task completion time, designated travel path, dwelling time at a task location, and heart rate range.

13. The method of claim 11, wherein the monitored data includes at least one of a location of the field monitoring device and biometric data of the worker.

14. The method of claim 11, wherein the notification message informs the worker of the abnormal status and includes an instruction for correcting the abnormal status.

15. The method of claim 14, wherein the instruction includes travel instructions.

16. The method of claim 11, wherein the control signal causes at least one component of the field monitoring device to be activated and capture data.

17. The method of claim 11, wherein each of the plurality of parameters includes a range of acceptable values, and
wherein the comparing includes determining whether the received monitored data is within the range of acceptable values.

18. The method of claim 17, wherein the detecting of the abnormal status includes determining that the received monitored data is outside of the range.

19. The method of claim 11, wherein the received monitored data includes captured images of an environment at a location of the field monitoring device.

20. The method of claim 11, wherein the received monitored data includes captured images, and
wherein the detecting of the abnormal status includes:
comparing the received captured images to stored images; and
recognizing environmental objects based on the comparing.

* * * * *